(12) United States Patent
Venkatadri et al.

(10) Patent No.: US 11,981,338 B2
(45) Date of Patent: May 14, 2024

(54) SYSTEMS AND METHODS FOR GENERATION AND UTILIZATION OF VEHICLE TESTING KNOWLEDGE STRUCTURES FOR AUTONOMOUS VEHICLE SIMULATION

(71) Applicant: UATC, LLC, Pittsburgh, PA (US)

(72) Inventors: Arun David Kain Venkatadri, Pittsburgh, PA (US); Jason C. Lee, Pittsburgh, PA (US); Yilun Tang, Pittsburgh, PA (US)

(73) Assignee: UATC, LLC, Pittsburgh, PA (US)

( * ) Notice: Subject to any disclaimer, the term of this patent is extended or adjusted under 35 U.S.C. 154(b) by 401 days.

(21) Appl. No.: 17/140,597

(22) Filed: Jan. 4, 2021

(65) Prior Publication Data
US 2022/0194395 A1 Jun. 23, 2022

Related U.S. Application Data

(60) Provisional application No. 63/129,171, filed on Dec. 22, 2020.

(51) Int. Cl.
| | |
|---|---|
| *B60W 50/02* | (2012.01) |
| *B60W 60/00* | (2020.01) |
| *G06N 5/00* | (2023.01) |
| *G07C 5/08* | (2006.01) |

(52) U.S. Cl.
CPC ...... *B60W 50/0205* (2013.01); *B60W 60/001* (2020.02); *G07C 5/0808* (2013.01)

(58) Field of Classification Search
CPC ............ B60W 50/0205; B60W 60/001; G07C 5/0808
See application file for complete search history.

(56) References Cited

U.S. PATENT DOCUMENTS

| | | | |
|---|---|---|---|
| 2018/0341276 A1* | 11/2018 | Kislovskiy | G01C 21/3461 |
| 2019/0043278 A1* | 2/2019 | Stefan | G07C 5/0808 |
| 2019/0129831 A1* | 5/2019 | Goldberg | G06F 3/04847 |
| 2019/0155291 A1* | 5/2019 | Heit | B60W 30/00 |
| 2021/0096571 A1* | 4/2021 | Modalavalasa | G07C 5/0816 |

* cited by examiner

*Primary Examiner* — Geepy Pe
*Assistant Examiner* — Kimia Kohankhaki
(74) *Attorney, Agent, or Firm* — Dority & Manning, P.A.

(57) ABSTRACT

A first vehicle testing tuple comprising a plurality of first testing parameters and a second vehicle testing tuple comprising a plurality of second testing parameters can be obtained. The plurality of first testing parameters can be determined to be associated with an evaluated operating condition. The first tuple can be appended to a first portion of a plurality of portions of a vehicle testing knowledge structure. A second testing parameter can be determined to be associated with an unevaluated operating condition. The unevaluated operating condition can be evaluated. A second portion comprising the second vehicle testing tuple can be generated for the vehicle testing knowledge structure.

19 Claims, 9 Drawing Sheets

SYSTEMS AND METHODS FOR GENERATION AND UTILIZATION OF VEHICLE TESTING KNOWLEDGE STRUCTURES FOR AUTONOMOUS VEHICLE SIMULATION

RELATED APPLICATION

The present application is based on and claims benefit of U.S. Provisional Patent Application No. 63/129,171 having a filing date of Dec. 22, 2020, which is incorporated by reference herein.

FIELD

The present disclosure relates generally to vehicle services and, more particularly, simulation of autonomous vehicle systems.

BACKGROUND

An autonomous vehicle can be capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path for navigating through such a surrounding environment.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method. The method can include obtaining, by a computing system comprising one or more computing devices, a first vehicle testing tuple comprising a plurality of first testing parameters and a second vehicle testing tuple comprising a plurality of second testing parameters. The method can include determining, by the computing system, that each of the plurality of first testing parameters are associated with an evaluated operating condition. The method can include appending, by the computing system at a first time step, the first tuple to a first portion of a plurality of portions of a vehicle testing knowledge structure, wherein each of the plurality of portions comprises one or more vehicle testing tuples, wherein the plurality of portions corresponds to a respective plurality of time steps, wherein the first portion corresponds to the first time step. The method can include determining, by the computing system, that a second testing parameter of the plurality of second testing parameters is associated with an unevaluated operating condition. The method can include evaluating, by the computing system at a second time step after the first time step, the unevaluated operating condition associated with the second testing parameter. The method can include generating, by the computing system, a second portion comprising the second vehicle testing tuple for the vehicle testing knowledge structure, wherein the second portion corresponds to the second time step.

Another example aspect of the present disclosure is directed to a computing system. The computing system can include one or more processors. The computing system can include a vehicle testing knowledge structure comprising a plurality of portions, wherein each of the plurality of portions comprises one or more vehicle testing tuples each comprising a plurality of vehicle testing parameters, wherein the plurality of portions corresponds to a respective plurality of time steps. The computing system can include one or more tangible, non-transitory computer readable media storing computer-readable instructions that when executed by the one or more processors cause the one or more processors to perform operations. The operations can include obtaining a first vehicle testing tuple comprising a plurality of first testing parameters and a second vehicle testing tuple comprising a plurality of second testing parameters. The operations can include determining that each of the plurality of first testing parameters are associated with an evaluated operating condition. The operations can include appending the first tuple to a first portion of the plurality of portions of the vehicle testing knowledge structure at a first time step of the plurality of time steps, wherein the first portion corresponds to the first time step. The operations can include determining that a second testing parameter of the plurality of second testing parameters is associated with an unevaluated operating condition. The operations can include evaluating the unevaluated operating condition associated with the second testing parameter at a second time step after the first time step. The operations can include generating a second portion comprising the second vehicle testing tuple for the vehicle testing knowledge structure, wherein the second portion corresponds to the second time step.

Another example aspect of the present disclosure is directed to one or more tangible, non-transitory computer readable media storing computer-readable instructions that when executed by one or more processors cause the one or more processors to perform operations. The operations can include obtaining a first vehicle testing parameter grouping comprising a plurality of first testing parameters and a second vehicle testing parameter grouping comprising a plurality of second testing parameters. The operations can include determining that each of the plurality of first testing parameters are associated with an evaluated operating condition. The operations can include appending, at a first time step, the first vehicle testing parameter grouping to a first portion of a plurality of portions of a vehicle testing knowledge structure, wherein each of the plurality of portions comprises one or more vehicle testing parameter groupings, wherein the plurality of portions corresponds to a respective plurality of time steps, wherein the first portion corresponds to the first time step. The operations can include determining that a second testing parameter of the plurality of second testing parameters is associated with an unevaluated operating condition. The operations can include evaluating, at a second time step after the first time step, the unevaluated operating condition associated with the second testing parameter. The operations can include generating a second portion comprising the second vehicle testing parameter grouping for the vehicle testing knowledge structure, wherein the second portion corresponds to the second time step.

Other example aspects of the present disclosure are directed to other systems, methods, vehicles, apparatuses, tangible non-transitory computer-readable media, and the like for utilization and/or generation of vehicle testing knowledge structure(s).

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
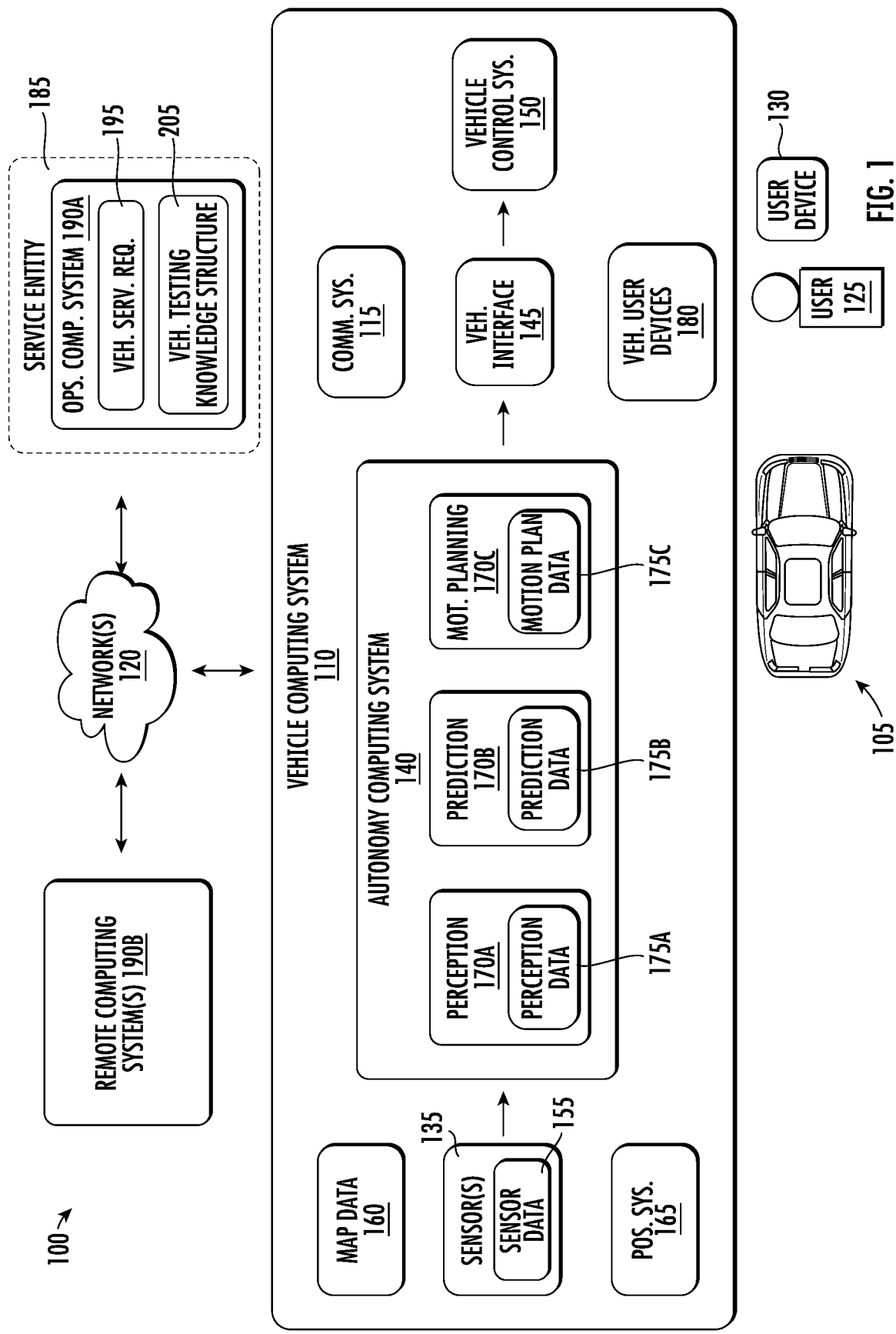
FIG. 1 depicts a block diagram of an example autonomous vehicle computing system according to example embodiments of the present disclosure.

Example aspects of the present application are directed autonomous vehicle testing and validation. More particularly, the systems and methods of the present disclosure are directed to generation and utilization of a vehicle testing knowledge structure for testing and validation of simulated autonomous vehicle performance. As an example, a first vehicle testing tuple (e.g., a plurality of testing parameters for scenario simulation) and a second vehicle tuple can be obtained. Each of the parameters of the first vehicle testing tuple can be determined to include an evaluated operating condition (e.g., a condition for which a vehicle is designed to operate, a condition included in an operational design domain (ODD), etc.). At a first time step, the first vehicle testing tuple can be appended to a first portion of a vehicle testing knowledge structure. The vehicle testing knowledge structure can include a plurality of portions, and each of the portions can correspond to a respective time step. For example, a current time step (e.g., the first time step, etc.) can correspond to a current portion of the vehicle testing knowledge structure (e.g., the first portion, etc.), while other portions of the plurality of portions can correspond to previous time steps (e.g., time steps before the first portion, etc.).

After appending the first vehicle testing tuple, the second vehicle testing tuple can be determined to include a testing parameter that is associated with an unevaluated operating condition (e.g., a condition for which a vehicle is not designed to operate, a condition not included in an operational design domain (ODD), etc.). At a second time step (e.g., at a time after appending the first vehicle testing tuple to the first portion, etc.), the unevaluated operating condition associated with the testing parameter can be evaluated (e.g., can be included as a condition for which the vehicle is designed to operate, can be included in an operational design domain, etc.). As an example, the unevaluated operating condition can be tested using an autonomous vehicle. After evaluating the operating condition, a second portion including the second vehicle testing tuple and corresponding to the second time step can be generated for the vehicle testing knowledge structure. In such fashion, the vehicle testing knowledge structure can be updated in real-time to account for evaluations of unevaluated operating conditions, therefore providing a resource that can be utilized to test and validate the development of autonomous vehicle capabilities over a series of time-steps.

More particularly, a first vehicle testing tuple and second vehicle testing tuple can be obtained. The first vehicle testing tuple (e.g., a vehicle testing parameter grouping, a grouping of parameters utilized for vehicle testing simulation, etc.) can include a plurality of first testing parameters, and the second vehicle testing tuple can include a plurality of second testing parameters. The parameters of the vehicle testing tuples can be any parameter associated with the testing of an autonomous vehicle testing scenario. As an example, the parameters may describe environmental condition(s) for a testing scenario (e.g., humidity, sunlight, cloud coverage, weather, temperature, wind, etc.). As another example, the parameters may describe required vehicle maneuver(s) for the scenario (e.g., execution of a certain turn maneuver, acceleration, deceleration, reaction to external actor(s), perception, prediction, motion planning, etc.). As another example, the parameters may describe operational condition(s) for the testing scenario (e.g., speed limit, no-stopping zones, a number of lanes, object(s) included in a road network, lateral clearance, underbody clearance, turn radius, a degree of incline/decline, bike lanes, etc.). As yet another example, the parameters may describe a location, pose and/or behavior(s) for one or more actors included in the scenario (e.g., specifying that an actor is riding a bicycle and is not compliant with road rules, etc.). For example, the parameters may describe an actor located at the sidewalk of an intersection, and who's behavior includes facing the intersection and walking into the intersection at predetermined time. As such, the parameters included in vehicle testing tuples can broadly describe any possible detail of a "real-world" testing scenario that is being simulated.

In some implementations, the parameters of the vehicle testing tuples can additionally describe the scenario itself that is to be tested. As an example, the parameters of the tuple may describe a specific scenario (e.g., testing of a left turn operation for an autonomous vehicle at an intersection, etc.). Alternatively, in some implementations, the parameters of the vehicle testing tuples can be utilized alongside a pre-defined testing scenario. For example, the testing scenario can describe the specific scenario to be tested (e.g., testing of a right turn operation, etc.), and the parameters can describe the conditions under which the scenario takes place (e.g., number/pose/behavior of actor(s), environmental conditions, etc.).

Once the first and second vehicle testing tuples are obtained, it can be determined that each of the plurality of first testing parameters are associated with an evaluated operating condition. More particularly, it can be determined that each of the first testing parameters is associated with an operating condition in which an autonomous vehicle can operate within or can be expected to operate within (e.g., a condition included in an operational design domain (ODD), etc.). As an example, a parameter of the plurality of first testing parameter can be associated with a heavy rain operating condition. It can be determined that the heavy rain operating condition is an evaluated operating condition (e.g., an autonomous vehicle has been evaluated to operate under a heavy rain operating condition, etc.). In such fashion, it can be determined (e.g., by a computing system, a service entity computing system, etc.) that each of the plurality of first testing parameters is associated with an operating condition that has been evaluated previously.

In some implementations, at least some of the plurality of parameters of a vehicle testing tuple (e.g., the first vehicle testing tuple, the second vehicle testing tuple, etc.) can be or otherwise correspond to a testing standard and/or a set of standardized testing parameters. As an example, at least some parameters of a plurality of testing parameters can be or otherwise correspond to a certain safety standard (e.g., ISO 21448, SOTIF, etc.). As another example, a parameter from a vehicle testing tuple can be or otherwise be associated with an evaluated testing parameter if the parameter is associated with operations included in a safety standard (e.g., ISO 21448, SOTIF, etc.). In some implementations, a safety standard can be utilized to determine whether an operating condition is an evaluated operating condition, and/or if a testing parameter is associated with an evaluated operating condition. As an example, a safety standard (e.g., ISO 21448, SOTIF, etc.), or an operational design domain, can specify a plurality of operating conditions (e.g., certain vehicle maneuvers, environmental conditions, behaviors, etc.) for which an autonomous vehicle can operate (e.g., conditions in which the vehicle is designed to operate, etc.). Each of the first plurality of testing parameters can be determined to be associated with an evaluated operating condition by comparing each of the testing parameters to the evaluated operating conditions specified by the certain safety standard. In such fashion, a testing parameter can be determined to be associated with a condition that has been evaluated for operation by an autonomous vehicle.

The first tuple can be appended to a first portion of a vehicle testing knowledge structure at a first time step (e.g., a representation of a specific moment in time, etc.). The vehicle testing knowledge structure (e.g., a data structure, database, model, etc.) can be or otherwise include a plurality of these portions, and each portion of the structure can include one or more vehicle testing tuples. Additionally, each portion of the vehicle testing knowledge structure can correspond to a respective time step. More particularly, the vehicle testing knowledge structure can include or otherwise represent the development of evaluated vehicle testing tuples over a plurality of time steps. As an example, one portion of the vehicle testing knowledge structure can include each vehicle testing tuple that had been utilized for autonomous vehicle systems testing up to a time step that corresponds to the portion. An additional portion that corresponds to a subsequent time step can include each of the vehicle testing tuples of the previous portion in addition to one or more new vehicle testing tuples that had been utilized for autonomous vehicle systems testing subsequent to the first time step. In such fashion, the vehicle testing knowledge structure can represent and/or include the advancement over time of autonomous vehicle systems testing parameters, and can also facilitate the usage of such representation for additional testing and validation of autonomous vehicle system performance.

It should be noted that "first" and "second" are referred to in the present disclosure with regards to portions and time steps merely to differentiate the portions and time steps described. More particularly, it should not be assumed that the terms "first portion" or "second portion" describe any particular placement or ordering of the portions within the vehicle testing knowledge structure. As an example, one or more portions can be included in the vehicle testing knowledge structure that are respectively associated with one or more time steps occurring prior to the first time step. As another example, one or more portions can be included in the vehicle testing knowledge structure that are respectively associated with one or more time steps occurring subsequently to the first time step and prior to the second time step corresponding to the second portion.

A second testing parameter of the plurality of second testing parameters can be associated with an unevaluated operating condition. More particularly, it can be determined that one of the plurality of second testing parameters is associated with an operating condition that has not been evaluated for operation by an autonomous vehicle. As an example, the parameter can be associated with a rare weather event that has not been evaluated for autonomous vehicle operations (e.g., an active volcano, etc.). As another example, the parameter can be associated with a rare sort of road pattern or maneuver (e.g., a type of turn maneuver that is unique to a geographic region, etc.). As yet another example, the parameter can be associated with a series of driving maneuvers that are not included in an operational design domain. In some implementations, the parameter can be determined to be associated with an unevaluated operating condition of the operating condition associated with the parameter is not included in a certain autonomous vehicle safety standard (e.g., ISO 21448, SOTIF, etc.). As an example, the certain autonomous vehicle safety standard can specify a number of operating conditions under which an autonomous vehicle has been designed to operate. The operating condition can be determined to be an unevaluated operating condition if the operating condition is not specified by the autonomous vehicle safety standard.

At a second time step after the first time step, the unevaluated operating condition associated with the second testing parameter can be evaluated. As an example, the unevaluated operating condition can be evaluated by simulating the autonomous vehicle operating under the operating condition. As another example, the unevaluated operating condition can be evaluated by operating the autonomous vehicle under the operating condition. As another example, the unevaluated operating condition can be evaluated by operating and/or simulating the autonomous vehicle under conditions that are representative of the operating condition.

In some implementations, to evaluate the unevaluated operating condition, data can be obtained that is descriptive of a performance of an autonomous vehicle operating under the unevaluated operating condition. In some implementations, the data can be based at least in part on a simulation of the autonomous vehicle operating under the unevaluated operating condition. As an example, a simulation can be performed that represents expected effect(s) associated with the unevaluated operating condition (e.g., simulated wind conditions associated with an unevaluated tornado operating condition, etc.). In some implementations, the data can be based at least in part on sensor data from a vehicle operating under the unevaluated operating condition. As an example, sensor data can be collected from a manually operated autonomous-capable vehicle (e.g., a manually operated vehicle that includes sensors sufficient to facilitate autonomous operation, etc.) that was operated under the unevaluated operating condition. In some implementations, the data can include sensor data from an autonomous vehicle that operated under an evaluated operating condition that is substantially similar and/or equivalent to the unevaluated operating condition. As an example, the unevaluated operating condition can represent a type of inclement weather (e.g., tornado-force wind conditions, etc.). The data can include sensor data from an autonomous vehicle operating under an evaluated inclement weather operating condition substantially similar and/or equivalent to the unevaluated inclement weather operating condition (e.g., hurricane-force wind conditions, etc.).

Based at least in part on the data, the unevaluated operating condition can be stored as an evaluated operating condition within the vehicle testing knowledge structure. More particularly, in some implementations the vehicle testing knowledge structure can be utilized to evaluate an unevaluated operating condition. As an example, the unevaluated operating condition can be or otherwise include a type of road pattern unique to a geographic region. One or more vehicle testing tuples can be determined from the vehicle testing knowledge structure that are associated with an evaluated operating condition that is substantially similar to the unevaluated operating condition (e.g., a substantially similar type of road pattern). Based on simulation and/or operating performance associated with the one or more vehicle testing tuples, the unevaluated operating condition can be evaluated. In such fashion, the vehicle testing knowledge structure can be utilized to reduce the number of unevaluated operating conditions for an autonomous vehicle without necessitating the use of significant testing and simulation expenses.

A second portion can be generated for the vehicle testing knowledge structure that corresponds to the second time step (e.g., subsequent to appending the first tuple to the first portion of the vehicle testing knowledge structure, etc.). The second portion can include the second vehicle testing tuple. In some implementations, each vehicle testing tuple included in a prior portion associated with a prior time step (e.g., the first portion) of the vehicle testing knowledge structure can be included in a subsequent portion associated with a subsequent time step (e.g., the second portion). As an example, the first portion can include the first vehicle testing tuple and any vehicle testing tuple(s) included in any portion(s) of the vehicle testing knowledge structure associated with time steps prior to the first time step. The second portion of the vehicle testing knowledge structure can include the second vehicle testing tuple, and can also include the first vehicle testing tuple and any other vehicle testing tuples included in the first portion.

In some implementations, performance data descriptive of autonomous vehicle performance for a first scenario type can be obtained. The first scenario type can be or otherwise include a type of scenario (e.g., a type and/or series of maneuver(s), behavior(s), environmental condition(s), actor behavior(s), traffic pattern(s), signage, etc.). As an example, the first scenario type may be a type of scenario in which an autonomous vehicle comes to a stop at an intersection in response to a pedestrian entering the intersection. As another example, the first scenario type may be a type of scenario in which an autonomous adjusts the positioning of the autonomous vehicle within a lane of a transportation network in response to a prediction of a second vehicle entering the space currently occupied by the autonomous vehicle. As such, it should be noted that a scenario type can broadly describe an operating situation for an autonomous vehicle to any desired degree of specificity.

The performance data can be or otherwise include real-world data from one or more autonomous vehicles operating under various conditions for the first scenario type. To follow the previously described example, the first scenario type can be a type of scenario in which an autonomous vehicle adjusts the positioning of itself within a lane of a transportation network in response to a prediction of a second vehicle entering the space currently occupied by the autonomous vehicle. The performance data can describe a real-world response of autonomous vehicles to the first scenario type under various operating conditions (e.g., environmental conditions, different actor behaviors, different levels of occlusion of surrounding actors, etc.). As such, the performance data can describe real-world data from a plurality of autonomous vehicles operating in the first scenario type under a varied number and type of operating conditions.

In some implementations, a subset of portions can be determined from the plurality of portions of the vehicle testing knowledge structure. Each of the subset of portions can include one or more vehicle testing tuples associated with the first scenario type. To follow the previously described example, the one or more vehicle testing tuples of each of the subset of portions can respectively include a plurality of parameters representative of various conditions for testing the type of scenario in which the autonomous vehicle comes to a stop at the intersection in response to the pedestrian entering the intersection. For example, a first vehicle testing tuple can include parameters that specify that the scenario takes place at night during moderate rain. A second testing tuple can include parameters that specify the scenario takes place at day during clear conditions. A third testing tuple can include parameters that specify a distance from the pedestrian and the autonomous vehicle, and an amount of occlusion between the autonomous vehicle and the pedestrian caused by one or more additional vehicles. As such, each of the one or more vehicle testing tuples of the subset of portions can respectively describe a different testing variation for the first type of scenario.

In some implementations, simulations can be performed using the vehicle testing tuple(s) of each of the subset of portions to obtain simulation data. The simulation data can describe simulated autonomous vehicle performance for the first scenario type. To follow the previously described example, the simulation data can describe how the autonomous vehicle performed under the conditions specified by each of the one or more vehicle testing tuples included in the subset of portions (e.g., performance under various environmental conditions, different actor behaviors, etc.).

In some implementations, a difference can be evaluated between the data descriptive of the autonomous vehicle performance and the simulation data. Based on the evaluation, a simulation accuracy value can be determined that indicates a simulation accuracy for the first scenario type by the vehicle testing knowledge structure. As an example, it can be determined that the performance of the autonomous vehicle described by the performance data is identical or substantially similar to the performance of the autonomous vehicle described by the simulation data. The simulation accuracy value can indicate that the simulation accuracy of the vehicle testing knowledge structure is sufficiently accurate as to generate simulation data that is equivalent to real-world performance data for the first scenario type.

In some implementations, the simulation accuracy of the vehicle testing knowledge structure for the first scenario type can be verified based at least in part on the simulation accuracy value. More particularly, the vehicle testing knowledge structure can be verified for generation of simulation data that is equivalent to the data descriptive of autonomous vehicle performance (e.g., real-world performance, etc.) for the first scenario type. As an example, the simulation accuracy value can indicate that the simulated performance data is identical or substantially similar to the performance data of the autonomous vehicle for the first scenario type (e.g., the real-world performance data for the first scenario type). Based at least in part on the accuracy of the vehicle testing knowledge structure, it can be determined that simulation data generated using the vehicle testing knowledge structure is functionally equivalent to real-world performance data for the autonomous vehicle.

In some implementations, a number of required autonomous vehicle testing miles can be reduced by a number of miles associated with the simulation data. More particularly, a "miles traveled" goal specified by certain safety standards can be met at least in part using the verified simulation data of the vehicle testing knowledge structure. As an example, certain autonomous vehicle safety standards (e.g., SOTIF criteria, ISO 21448, etc.), as well as conventional standards within the autonomous vehicle industry, specify that an autonomous vehicle must travel a required number of miles (e.g., 6 billion miles, etc.) to properly certify the safety and performance of the autonomous vehicle. However, such a quantity of miles is generally considered to be prohibitively difficult to perform. By verifying the simulated performance of an autonomous vehicle using the vehicle testing knowledge structure as equivalent to performance of "real-world" miles by an autonomous vehicle, the vehicle testing knowledge structure can be utilized to facilitate generation of performance data that satisfies the required number of miles specified by various safety standards.

In some implementations, data descriptive of an unknown scenario type can be obtained. More particularly, data can be obtained that describes a scenario type that an autonomous vehicle has not yet operated under and/or has not yet been designed to operate under (e.g., not included in an operational design domain, etc.). As an example, the unknown scenario type may describe a series of maneuvers required to utilize a certain type of transportation infrastructure unique to a geographic region (e.g., a "jughandle" turn that is generally found only in New Jersey, U.S.A, etc.). As another example, the unknown scenario type may describe a series of maneuvers required to avoid a rarely occurring type of natural disaster (e.g., a series of maneuvers and/or behaviors performed to avoid environmental conditions resulting from a volcanic eruption, etc.).

In some implementations, a known scenario type represented by one or more vehicle testing tuples can be determined to be similar to the unknown scenario type. To follow the previously described example, it can be determined (e.g., based on simulation data associated with the known scenario type, etc.) that one or more other known scenarios associated with traversal of an on-ramp for a highway and/or performance of a left turn maneuver are substantially similar to an unknown scenario type associated with a "jughandle" turn that is only used in a certain geographic region. Vehicle testing tuple(s) of the vehicle testing knowledge structure that are associated with the known scenario type can include parameters that describe various operating conditions for the known scenario type. As another example, the unevaluated scenario type can describe or otherwise include a plurality of autonomous vehicle maneuvers (e.g., entering a specific type of on-ramp unique to a geographic region, performing a standard left turn, entering a standard off-ramp, etc.), and the evaluated scenario type can include a subset of the plurality of autonomous vehicle maneuvers (e.g., entering a standard type of on-ramp, performing a standard left turn, entering a standard off-ramp, etc.).

In some implementations, determining that the known scenario type is similar to the unknown scenario type can include obtaining vehicle operating data associated with testing of the unknown scenario type. As an example, the operating data can be or otherwise include sensor data from a vehicle (e.g., an autonomous vehicle, a manually operated vehicle, etc.) operating under the unknown scenario type. To follow the previous example, the vehicle operating data can describe performance of the vehicle and/or any maneuvers performed while navigating a "jughandle" turn. As another example, the operating data can be data descriptive of a simulation of a vehicle performing maneuvers to navigate a "jughandle" turn. It should be noted that the operating data is not necessarily data that is obtained from the sensors of a vehicle. Rather, the operating data can also be data that describes an expected series of maneuvers that are required to operate under the unknown testing scenario.

In some implementations, determining that the known scenario type is similar or equivalent to the unknown scenario type can include evaluating a difference between the autonomous vehicle testing data and simulation data associated with simulation of the known scenario type using the one or more vehicle testing tuples. More particularly, simulation data that was previously generated using the one or more vehicle testing tuples can be utilized to determine the similarity between the unknown scenario type and the known scenario type. As an example, the unknown scenario type can describe a series of maneuvers required to utilize a certain type of transportation infrastructure unique to a geographic region (e.g., a "jughandle" turn that is mostly found in New Jersey, U.S., etc.). The known scenario type can describe a series of maneuvers required to utilize a standard type of transportation infrastructure (e.g., entering an on-ramp followed by a left turn, etc.). A difference can be evaluated between the previously generated simulation data for the known scenario type and the operating data for the unknown scenario type. Based on this difference, it can be determined that the known scenario type represented by the one or more vehicle testing tuples is equivalent to the unknown scenario type.

In some implementations, the scenario of the unknown scenario type can be simulated using the vehicle testing tuple associated with the known scenario type to obtain simulation data. The simulation data can describe autonomous vehicle performance for the unknown scenario type. More particularly, after determining that the known scenario type is similar to the unknown scenario type, it can be determined that simulation of the known scenario type using the vehicle testing knowledge structure is functionally equivalent to simulation of autonomous vehicle performance for the unknown scenario type. As such, simulation of the known scenario type using the associated vehicle testing tuple can generate simulation data that describes autonomous vehicle performance for both the known scenario type and the unknown scenario type. In such fashion, the need to simulate exceedingly rare scenario types can be obviated by determining a functional equivalent simulation type included in the vehicle testing knowledge structure, therefore significantly reducing the number of scenario types required to be simulated.

In some implementations, a first known scenario type can be determined to be equivalent to a second known scenario type. More particularly, the performance of an autonomous vehicle (e.g., action(s), behavior(s), etc.) under a first known scenario type can be determined to be equivalent to the performance of the autonomous vehicle while operating under the second known scenario type. As an example, a first known scenario type can describe a series of driving maneuvers required to navigate the autonomous vehicle through a scenario in which law enforcement are pursuing a cyclist. A second known scenario type can describe a series of driving maneuvers required to navigate the autonomous vehicle through a scenario in which a cyclist does not comply with road rules (e.g., not utilizing a bike lane, ignoring signage, etc.). Vehicle testing tuples can be obtained from the vehicle testing knowledge structure that are associated with both the first known scenario type and the second known scenario type. The vehicle testing tuples can be utilized to simulate the first known scenario type and the second known scenario type to obtain first scenario simulation data and second scenario simulation data. Based on a comparison between the first scenario simulation data and the second scenario simulation data, it can be determined that operation by the autonomous vehicle under the first scenario type is functionally equivalent to operation by the autonomous vehicle under the second scenario type. To follow the previously described example, it can be determined that the operation of the autonomous vehicle to navigate around pursuit of the cyclist (e.g., action(s), decision(s), behavior(s), etc.) is functionally equivalent to the operation of the autonomous vehicle to navigate around the non-compliant cyclist.

In some implementations, in response to determining that the first known scenario type is equivalent to the second known scenario type, the second known testing scenario can be eliminated from the vehicle testing knowledge structure. More particularly, vehicle testing tuples of the portion(s) of the vehicle testing knowledge structure associated with the second known scenario type can be associated with the first scenario type, and the second scenario type can be eliminated. Additionally, in some implementations, the first known scenario type can be adjusted (e.g., a description of the first scenario type, etc.) to indicate that the first known scenario type is also representative of the second known scenario type. In such fashion, known scenario type(s) of the vehicle testing knowledge structure can be evaluated and merged if substantially similar, therefore significantly reducing a total computational simulation cost associated with simulation of each known scenario type.

In some implementations, the computing system and vehicle testing knowledge structure can be or otherwise include a service entity computing system associated with a service entity that facilitates autonomous vehicle services. As an example, the service entity can facilitate provision of both first-party and third-party autonomous vehicle services (e.g., delivery services, transportation services, courier services, aerial transportation services, etc.). Additionally, in some implementations, the autonomous vehicle can be associated with the service entity (e.g., a first-party autonomous vehicle of the service entity, a third-party autonomous vehicle of a vehicle provider that provides services facilitated by the service entity, etc.). Alternatively, in some implementations, the computing system can be or otherwise include an autonomous vehicle computing system of the autonomous vehicle that is configured to implement various autonomous vehicle systems (e.g., motion planning system(s), perception system(s), prediction system(s), etc.).

In some implementations, the computing system and vehicle testing knowledge structure can be or otherwise include a service entity computing system associated with a service entity that facilitates autonomous vehicle functionality. The vehicle testing knowledge structure can be stored (e.g., on one or more memories) on the service entity computing system or can otherwise be accessed and modified by the service entity computing system. More particularly, portion(s) of the vehicle testing knowledge structure can be generated for the vehicle testing knowledge structure by the service entity computing system. The service entity computing system can, in some implementations, generate additional portion(s) for the vehicle testing knowledge structure in response to evaluation of unevaluated operating condition(s). As an example, the service entity computing system can evaluate an unevaluated operating condition at a certain time step (e.g., providing an autonomous vehicle computing system with instructions configured to operate autonomously under the unevaluated operating condition, etc.). In response, the service entity computing system can generate a portion for the autonomous vehicle inclusive of one or more vehicle testing tuple(s) associated with the unevaluated operating condition. In such fashion, the service entity computing system can utilize the vehicle testing knowledge structure to ensure validation of autonomous vehicle testing results over a period of time, therefore facilitating autonomous vehicle functionality.

It should be noted that the examples of the present disclosure are primarily described in the context of a ground-based autonomous vehicle merely to illustrate the various systems and methods of the present disclosure. Rather, the autonomous vehicle(s) of the present disclosure can be any sort or type of autonomous vehicle, including but not limited to ground-based autonomous vehicles, water-based autonomous vehicles, and/or aerial autonomous vehicles (e.g., vertical take-off and landing vehicles, etc.). Additionally, in some implementations, systems and methods of the present disclosure can be utilized for non-autonomous vehicles and/or semi-autonomous vehicles. Further, the use of tuples is not meant to be limiting. Other data types representing collections of data (e.g., list, set, etc.) can be additionally or alternatively used within the technology described herein.

Various means can be configured to perform the methods and processes described herein. For example, a computing system can include vehicle testing tuple obtaining unit(s), evaluated operating condition determining unit(s), tuple appending unit(s), unevaluated operating condition determining unit(s), operating condition evaluating unit(s), portion generating unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to obtain a first vehicle testing tuple and a second vehicle testing tuple (e.g., respective pluralities of testing parameters for testing of a vehicle testing scenario, etc.). A vehicle testing tuple obtaining unit is an example of means for obtaining a first vehicle testing tuple and a second vehicle testing tuple as described herein.

The means can be configured to determine whether each of a plurality of testing parameters are associated with an evaluated operating condition. For example, the means can be configured to determine that each parameter of the plurality of first parameters of the first vehicle testing tuple is respectively associated with an evaluated operating condition (e.g., a condition in which an autonomous vehicle is designed to operate under, etc.). An evaluated operating condition determining unit is one example of a means for determining that each parameter of a plurality of parameters is respectively associated with an evaluated operating condition as described herein.

The means can be configured to append a tuple to a portion of a plurality of portions of a vehicle testing knowledge structure. For example, the means can be configured to append the first tuple at a first time step to a first portion of a plurality of portions of a vehicle testing knowledge structure. Each of the plurality of portions can include vehicle testing tuple(s) (e.g., the first vehicle testing tuple, etc.), and each of the plurality of portions can correspond to a respective plurality of time steps. The first portion to which the first tuple is appended can correspond to the first time step. A tuple appending unit is one example of a means for appending a tuple to a portion of a vehicle testing knowledge structure as described herein.

The means can be configured to determine that at least one parameter of a plurality of testing parameters is associated with an unevaluated operating condition. For example, the means can be configured to determine that a second parameter of the plurality of second parameters of the second vehicle testing tuple is respectively associated with an unevaluated operating condition (e.g., a condition in which an autonomous vehicle is not designed to operate under, etc.). An unevaluated operating condition determining unit is one example of a means for determining that at least one parameter of a plurality of parameters is associated with an unevaluated operating condition as described herein.

The means can be configured to evaluate an unevaluated operating condition associated with a testing parameter. For example, the means can be configured to evaluate the unevaluated operating condition associated with the second testing parameter of the second vehicle testing tuple (e.g., simulating the unevaluated operating condition, obtaining vehicle performance data for operation under the unevaluated operating condition, etc.). An operating condition evaluating unit is one example of a means for evaluating an unevaluated operating condition associated with a testing parameter as described herein.

The means can be configured to generate a portion for a vehicle testing knowledge structure. For example, the means can be configured to generate a second portion for the vehicle testing knowledge structure that corresponds to the second time step. The second portion can include the second vehicle testing tuple (e.g., a portion of the vehicle knowledge structure including all previous vehicle testing tuples and corresponding to the second time step, etc.). A portion generating unit is one example of a means for generating a portion for a vehicle testing knowledge structure as described herein.

The present disclosure provides a number of technical effects and benefits. As one example technical effect and benefit, various safety criteria (e.g., SOTIF criteria, ISO 21448, etc.), alongside conventional industry standards, specify a required number of miles to fully certify autonomous functionality (e.g., 6 billion miles, etc.). However, fulfilment of these mile targets is generally considered impossible or prohibitively difficult. The capability to generate simulated miles that were validated to be equivalent to "real-world" miles would allow this milestone to be overcome. By generating and utilizing a vehicle testing knowledge structure, systems and methods of the present disclosure can validate the accuracy of simulation performance to be equivalent to real-world performance, therefore facilitating the usage of simulation miles to reach miles traveled targets and significantly reducing the costs associated with real-world evaluation of autonomous vehicle systems performance.

As another example technical effect and benefit, an almost-infinite number of scenarios can exist that an autonomous vehicle could possibly operate under. However, testing and validating the performance of autonomous vehicle systems under each possible scenario represents a prohibitively difficult task. Generating and utilizing a vehicle testing knowledge structure, systems and methods of the present disclosure can determine that performance of an autonomous vehicle under an unknown testing scenario is functionally equivalent to performance of the autonomous vehicle under a testing scenario that is already known. By validating unknown testing scenarios as being functionally equivalent to known testing scenarios, the systems and methods of the present disclosure can substantially reduce the number of scenarios that require evaluation, therefore providing a feasibly achievable target for evaluation of autonomous vehicle testing scenarios and significantly reducing the costs and inefficiencies associated with the testing and validation of autonomous vehicle withing testing scenarios.

With reference now to the FIGS., example aspects of the present disclosure will be discussed in further detail. FIG. 1 depicts a block diagram of an example system 100 for controlling and communicating with a vehicle according to example aspects of the present disclosure. As illustrated, FIG. 1 shows a system 100 that can include a vehicle 105 and a vehicle computing system 110 associated with the vehicle 105. The vehicle computing system 100 can be located onboard the vehicle 105 (e.g., it can be included on and/or within the vehicle 105).

The vehicle 105 incorporating the vehicle computing system 100 can be various types of vehicles. For instance, the vehicle 105 can be an autonomous vehicle. The vehicle 105 can be a ground-based autonomous vehicle (e.g., car, truck, bus, etc.). The vehicle 105 can be an air-based autonomous vehicle (e.g., airplane, helicopter, vertical take-off and lift (VTOL) aircraft, etc.). The vehicle 105 can be a light weight elective vehicle (e.g., bicycle, scooter, etc.). The vehicle 105 can be another type of vehicles (e.g., watercraft, etc.). The vehicle 105 can drive, navigate, operate, etc. with minimal and/or no interaction from a human operator (e.g., driver, pilot, etc.). In some implementations, a human operator can be omitted from the vehicle 105 (and/or also omitted from remote control of the vehicle 105). In some implementations, a human operator can be included in the vehicle 105.

The vehicle 105 can be configured to operate in a plurality of operating modes. The vehicle 105 can be configured to operate in a fully autonomous (e.g., self-driving) operating mode in which the vehicle 105 is controllable without user input (e.g., can drive and navigate with no input from a human operator present in the vehicle 105 and/or remote from the vehicle 105). The vehicle 105 can operate in a semi-autonomous operating mode in which the vehicle 105 can operate with some input from a human operator present in the vehicle 105 (and/or a human operator that is remote from the vehicle 105). The vehicle 105 can enter into a manual operating mode in which the vehicle 105 is fully controllable by a human operator (e.g., human driver, pilot, etc.) and can be prohibited and/or disabled (e.g., temporary, permanently, etc.) from performing autonomous navigation (e.g., autonomous driving, flying, etc.). The vehicle 105 can be configured to operate in other modes such as, for example, park and/or sleep modes (e.g., for use between tasks/actions such as waiting to provide a vehicle service, recharging, etc.). In some implementations, the vehicle 105 can implement vehicle operating assistance technology (e.g., collision mitigation system, power assist steering, etc.), for example, to help assist the human operator of the vehicle 105 (e.g., while in a manual mode, etc.).

To help maintain and switch between operating modes, the vehicle computing system 110 can store data indicative of the operating modes of the vehicle 105 in a memory onboard the vehicle 105. For example, the operating modes can be defined by an operating mode data structure (e.g., rule, list, table, etc.) that indicates one or more operating parameters for the vehicle 105, while in the particular operating mode. For example, an operating mode data structure can indicate that the vehicle 105 is to autonomously plan its motion when in the fully autonomous operating mode. The vehicle computing system 110 can access the memory when implementing an operating mode.

The operating mode of the vehicle 105 can be adjusted in a variety of manners. For example, the operating mode of the vehicle 105 can be selected remotely, off-board the vehicle 105. For example, a remote computing system (e.g., of a vehicle provider and/or service entity associated with the vehicle 105) can communicate data to the vehicle 105 instructing the vehicle 105 to enter into, exit from, maintain, etc. an operating mode. By way of example, such data can instruct the vehicle 105 to enter into the fully autonomous operating mode.

In some implementations, the operating mode of the vehicle 105 can be set onboard and/or near the vehicle 105. For example, the vehicle computing system 110 can automatically determine when and where the vehicle 105 is to enter, change, maintain, etc. a particular operating mode (e.g., without user input). Additionally, or alternatively, the operating mode of the vehicle 105 can be manually selected via one or more interfaces located onboard the vehicle 105 (e.g., key switch, button, etc.) and/or associated with a computing device proximate to the vehicle 105 (e.g., a tablet operated by authorized personnel located near the vehicle 105). In some implementations, the operating mode of the vehicle 105 can be adjusted by manipulating a series of interfaces in a particular order to cause the vehicle 105 to enter into a particular operating mode.

The vehicle computing system 110 can include one or more computing devices located onboard the vehicle 105. For example, the computing device(s) can be located on and/or within the vehicle 105. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 105 (e.g., its computing system, one or more processors, etc.) to perform operations and functions, such as those described herein for controlling an autonomous vehicle, communicating with other computing systems, generating, appending, and/or otherwise utilizing a vehicle testing knowledge structure 205, performing vehicle testing simulations using the vehicle testing knowledge structure 205, etc.

The vehicle 105 can include a communications system 115 configured to allow the vehicle computing system 110 (and its computing device(s)) to communicate with other computing devices. The communications system 115 can include any suitable components for interfacing with one or more network(s) 120, including, for example, transmitters, receivers, ports, controllers, antennas, and/or other suitable components that can help facilitate communication. In some implementations, the communications system 115 can include a plurality of components (e.g., antennas, transmitters, and/or receivers) that allow it to implement and utilize multiple-input, multiple-output (MIMO) technology and communication techniques.

The vehicle computing system 110 can use the communications system 115 to communicate with one or more computing device(s) that are remote from the vehicle 105 over one or more networks 120 (e.g., via one or more wireless signal connections). The network(s) 120 can exchange (send or receive) signals (e.g., electronic signals), data (e.g., data from a computing device), and/or other information and include any combination of various wired (e.g., twisted pair cable) and/or wireless communication mechanisms (e.g., cellular, wireless, satellite, microwave, and radio frequency) and/or any desired network topology (or topologies). For example, the network(s) 120 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communication network (or combination thereof) for transmitting data to and/or from the vehicle 105 and/or among computing systems.

In some implementations, the communications system 115 can also be configured to enable the vehicle 105 to communicate with and/or provide and/or receive data and/or signals from a remote computing device associated with a user 125 and/or an item (e.g., an item to be picked-up for a courier service). For example, the communications system 115 can allow the vehicle 105 to locate and/or exchange communications with a user device 130 of a user 125. In some implementations, the communications system 115 can allow communication among one or more of the system(s) on-board the vehicle 105.

As shown in FIG. 1, the vehicle 105 can include one or more sensors 135, an autonomy computing system 140, a vehicle interface 145, one or more vehicle control systems 150, and other systems, as described herein. One or more of these systems can be configured to communicate with one another via one or more communication channels. The communication channel(s) can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel(s).

The sensor(s) 135 can be configured to acquire sensor data 155. The sensor(s) 135 can be external sensors configured to acquire external sensor data. This can include sensor data associated with the surrounding environment of the vehicle 105. The surrounding environment of the vehicle 105 can include/be represented in the field of view of the sensor(s) 135. For instance, the sensor(s) 135 can acquire image and/or other data of the environment outside of the vehicle 105 and within a range and/or field of view of one or more of the sensor(s) 135. The sensor(s) 135 can include one or more Light Detection and Ranging (LIDAR) systems, one or more Radio Detection and Ranging (RADAR) systems, one or more cameras (e.g., visible spectrum cameras, infrared cameras, etc.), one or more motion sensors, one or more audio sensors (e.g., microphones, etc.), and/or other types of imaging capture devices and/or sensors. The one or more sensors can be located on various parts of the vehicle 105 including a front side, rear side, left side, right side, top, and/or bottom of the vehicle 105. The sensor data 155 can include image data (e.g., 2D camera data, video data, etc.), RADAR data, LIDAR data (e.g., 3D point cloud data, etc.), audio data, and/or other types of data. The vehicle 105 can also include other sensors configured to acquire data associated with the vehicle 105. For example, the vehicle 105 can include inertial measurement unit(s), wheel odometry devices, and/or other sensors.

In some implementations, the sensor(s) 135 can include one or more internal sensors. The internal sensor(s) can be configured to acquire sensor data 155 associated with the interior of the vehicle 105. For example, the internal sensor(s) can include one or more cameras, one or more infrared sensors, one or more motion sensors, one or more weight sensors (e.g., in a seat, in a trunk, etc.), and/or other types of sensors. The sensor data 155 acquired via the internal sensor(s) can include, for example, image data indicative of a position of a passenger or item located within the interior (e.g., cabin, trunk, etc.) of the vehicle 105. This information can be used, for example, to ensure the safety of the passenger, to prevent an item from being left by a passenger, confirm the cleanliness of the vehicle 105, remotely assist a passenger, etc.

In some implementations, the sensor data 155 can be indicative of one or more objects within the surrounding environment of the vehicle 105. The object(s) can include, for example, vehicles, pedestrians, bicycles, and/or other objects. The object(s) can be located in front of, to the rear of, to the side of, above, below the vehicle 105, etc. The sensor data 155 can be indicative of locations associated with the object(s) within the surrounding environment of the vehicle 105 at one or more times. The object(s) can be static objects (e.g., not in motion) and/or dynamic objects/actors (e.g., in motion or likely to be in motion) in the vehicle's environment. The sensor(s) 135 can provide the sensor data 155 to the autonomy computing system 140.

In addition to the sensor data 155, the autonomy computing system 140 can obtain map data 160. The map data 160 can provide detailed information about the surrounding environment of the vehicle 105 and/or the geographic area in which the vehicle was, is, and/or will be located. For example, the map data 160 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, and/or other traffic control devices); obstruction information (e.g., temporary or permanent blockages, etc.); event data (e.g., road closures/traffic rule alterations due to parades, concerts, sporting events, etc.); nominal vehicle path data (e.g., indicate of an ideal vehicle path such as along the center of a certain lane, etc.); and/or any other map data that provides information that assists the vehicle computing system 110 in processing, analyzing, and perceiving its surrounding environment and its relationship thereto. In some implementations, the map data 160 can include high definition map data. In some implementations, the map data 160 can include sparse map data indicative of a limited number of environmental features (e.g., lane boundaries, etc.). In some implementations, the map data can be limited to geographic area(s) and/or operating domains in which the vehicle 105 (or autonomous vehicles generally) may travel (e.g., due to legal/regulatory constraints, autonomy capabilities, and/or other factors).

The vehicle 105 can include a positioning system 165. The positioning system 165 can determine a current position of the vehicle 105. This can help the vehicle 105 localize itself within its environment. The positioning system 165 can be any device or circuitry for analyzing the position of the vehicle 105. For example, the positioning system 165 can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the vehicle 105 can be used by various systems of the vehicle computing system 110 and/or provided to a remote computing system. For example, the map data 160 can provide the vehicle 105 relative positions of the elements of a surrounding environment of the vehicle 105. The vehicle 105 can identify its position within the surrounding environment (e.g., across six axes, etc.) based at least in part on the map data 160. For example, the vehicle computing system 110 can process the sensor data 155 (e.g., LIDAR data, camera data, etc.) to match it to a map of the surrounding environment to get an understanding of the vehicle's position within that environment. Data indicative of the vehicle's position can be stored, communicated to, and/or otherwise obtained by the autonomy computing system 140.

The autonomy computing system 140 can perform various functions for autonomously operating the vehicle 105. For example, the autonomy computing system 140 can perform the following functions: perception 170A, prediction 170B, and motion planning 170C. For example, the autonomy computing system 130 can obtain the sensor data 155 via the sensor(s) 135, process the sensor data 155 (and/or other data) to perceive its surrounding environment, predict the motion of objects within the surrounding environment, and generate an appropriate motion plan through such surrounding environment. In some implementations, these autonomy functions can be performed by one or more sub-systems such as, for example, a perception system, a prediction system, a motion planning system, and/or other systems that cooperate to perceive the surrounding environment of the vehicle 105 and determine a motion plan for controlling the motion of the vehicle 105 accordingly. In some implementations, one or more of the perception, prediction, and/or motion planning functions 170A, 170B, 170C can be performed by (and/or combined into) the same system and/or via shared computing resources. In some implementations, one or more of these functions can be performed via difference sub-systems. As further described herein, the autonomy computing system 140 can communicate with the one or more vehicle control systems 150 to operate the vehicle 105 according to the motion plan (e.g., via the vehicle interface 145, etc.).

The vehicle computing system 110 (e.g., the autonomy computing system 140) can identify one or more objects that within the surrounding environment of the vehicle 105 based at least in part on the sensor data 135 and/or the map data 160. The objects perceived within the surrounding environment can be those within the field of view of the sensor(s) 135 and/or predicted to be occluded from the sensor(s) 135. This can include object(s) not in motion or not predicted to move (static objects) and/or object(s) in motion or predicted to be in motion (dynamic objects/actors). The vehicle computing system 110 (e.g., performing the perception function 170C, using a perception system, etc.) can process the sensor data 155, the map data 160, etc. to obtain perception data 175A. The vehicle computing system 110 can generate perception data 175A that is indicative of one or more states (e.g., current and/or past state(s)) of one or more objects that are within a surrounding environment of the vehicle 105. For example, the perception data 175A for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape, object highlighting, etc.); class (e.g., pedestrian class vs. vehicle class vs. bicycle class, etc.), the uncertainties associated therewith, and/or other state information. The vehicle computing system 110 can utilize one or more algorithms and/or machine-learned model(s) that are configured to identify object(s) based at least in part on the sensor data 155. This can include, for example, one or more neural networks trained to identify object(s) within the surrounding environment of the vehicle 105 and the state data associated therewith. The perception data 175A can be utilized for the prediction function 175B of the autonomy computing system 140.

The vehicle computing system 110 can be configured to predict a motion of the object(s) within the surrounding environment of the vehicle 105. For instance, the vehicle computing system 110 can generate prediction data 175B associated with such object(s). The prediction data 175B can be indicative of one or more predicted future locations of each respective object. For example, the prediction system 175B can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 175B can be indicative of the speed and/or acceleration at which the respective object is predicted to travel along its associated predicted motion trajectory. The vehicle computing system 110 can utilize one or more algorithms and/or machine-learned model(s) that are configured to predict the future motion of object(s) based at least in part on the sensor data 155, the perception data 175A, map data 160, and/or other data. This can include, for example, one or more neural networks trained to predict the motion of the object(s) within the surrounding environment of the vehicle 105 based at least in part on the past and/or current state(s) of those objects as well as the environment in which the objects are located (e.g., the lane boundary in which it is travelling, etc.). The prediction data 175B can be utilized for the motion planning function 170C of the autonomy computing system 140.

The vehicle computing system 110 can determine a motion plan for the vehicle 105 based at least in part on the perception data 175A, the prediction data 175B, and/or other data. For example, the vehicle computing system 110 can generate motion planning data 175C indicative of a motion plan. The motion plan can include vehicle actions (e.g., speed(s), acceleration(s), other actions, etc.) with respect to one or more of the objects within the surrounding environment of the vehicle 105 as well as the objects' predicted movements. The motion plan can include one or more vehicle motion trajectories that indicate a path for the vehicle 105 to follow. A vehicle motion trajectory can be of a certain length and/or time range. A vehicle motion trajectory can be defined by one or more way points (with associated coordinates). The planned vehicle motion trajectories can indicate the path the vehicle 105 is to follow as it traverses a route from one location to another. Thus, the vehicle computing system 110 can take into account a route/route data when performing the motion planning function 170C.

The vehicle motion planning system can include an optimization algorithm, machine-learned model, etc. that considers cost data associated with a vehicle action as well as other objective functions (e.g., cost functions based on speed limits, traffic lights, etc.), if any, to determine optimized variables that make up the motion plan. The vehicle computing system 110 can determine that the vehicle 105 can perform a certain action (e.g., pass an object, etc.) without increasing the potential risk to the vehicle 105 and/or violating any traffic laws (e.g., speed limits, lane boundaries, signage, etc.). For instance, the vehicle computing system 110 can evaluate the predicted motion trajectories of one or more objects during its cost data analysis to help determine an optimized vehicle trajectory through the surrounding environment. The motion planning system 180 can generate cost data associated with such trajectories. In some implementations, one or more of the predicted motion trajectories and/or perceived objects may not ultimately change the motion of the vehicle 105 (e.g., due to an overriding factor). In some implementations, the motion plan may define the vehicle's motion such that the vehicle 105 avoids the object(s), reduces speed to give more leeway to one or more of the object(s), proceeds cautiously, performs a stopping action, passes an object, queues behind/in front of an object, etc.

The vehicle computing system 110 can be configured to continuously update the vehicle's motion plan and a corresponding planned vehicle motion trajectories. For example, in some implementations, the vehicle computing system 110 can generate new motion planning data 175C/motion plan(s) for the vehicle 105 (e.g., multiple times per second, etc.). Each new motion plan can describe a motion of the vehicle 105 over the next planning period (e.g., next several seconds, etc.). Moreover, a new motion plan may include a new planned vehicle motion trajectory. Thus, in some implementations, the vehicle computing system 110 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 105.

The vehicle computing system 110 can cause the vehicle 105 to initiate a motion control in accordance with at least a portion of the motion planning data 175C. A motion control can be an operation, action, etc. that is associated with controlling the motion of the vehicle 105. For instance, the motion planning data 175C can be provided to the vehicle control system(s) 150 of the vehicle 105. The vehicle control system(s) 150 can be associated with a vehicle interface 145 that is configured to implement a motion plan. The vehicle interface 145 can serve as an interface/conduit between the autonomy computing system 140 and the vehicle control systems 150 of the vehicle 105 and any electrical/mechanical controllers associated therewith. The vehicle interface 145 can, for example, translate a motion plan into instructions for the appropriate vehicle control component (e.g., acceleration control, brake control, steering control, etc.). By way of example, the vehicle interface 145 can translate a determined motion plan into instructions to adjust the steering of the vehicle 105 "X" degrees, apply a certain magnitude of braking force, increase/decrease speed, etc. The vehicle interface 145 can help facilitate the responsible vehicle control (e.g., braking control system, steering control system, acceleration control system, etc.) to execute the instructions and implement a motion plan (e.g., by sending control signal(s), making the translated plan available, etc.). This can allow the vehicle 105 to autonomously travel within the vehicle's surrounding environment.

The vehicle computing system 110 can store other types of data. For example, an indication, record, and/or other data indicative of the state of the vehicle (e.g., its location, motion trajectory, health information, etc.), the state of one or more users (e.g., passengers, operators, etc.) of the vehicle, and/or the state of an environment including one or more objects (e.g., the physical dimensions and/or appearance of the one or more objects, locations, predicted motion, etc.) can be stored locally in one or more memory devices of the vehicle 105. Additionally, the vehicle 105 can communicate data indicative of the state of the vehicle, the state of one or more passengers of the vehicle, and/or the state of an environment to a computing system that is remote from the vehicle 105, which can store such information in one or more memories remote from the vehicle 105. Moreover, the vehicle 105 can provide any of the data created and/or store onboard the vehicle 105 to another vehicle.

The vehicle computing system 110 can include the one or more vehicle user devices 180. For example, the vehicle computing system 110 can include one or more user devices with one or more display devices located onboard the vehicle 105. A display device (e.g., screen of a tablet, laptop, and/or smartphone) can be viewable by a user of the vehicle 105 that is located in the front of the vehicle 105 (e.g., driver's seat, front passenger seat). Additionally, or alternatively, a display device can be viewable by a user of the vehicle 105 that is located in the rear of the vehicle 105 (e.g., a back passenger seat). The user device(s) associated with the display devices can be any type of user device such as, for example, a table, mobile phone, laptop, etc. The vehicle user device(s) 180 can be configured to function as human-machine interfaces. For example, the vehicle user device(s) 180 can be configured to obtain user input, which can then be utilized by the vehicle computing system 110 and/or another computing system (e.g., a remote computing system, etc.). For example, a user (e.g., a passenger for transportation service, a vehicle operator, etc.) of the vehicle 105 can provide user input to adjust a destination location of the vehicle 105. The vehicle computing system 110 and/or another computing system can update the destination location of the vehicle 105 and the route associated therewith to reflect the change indicated by the user input.

The vehicle 105 can be configured to perform vehicle services for one or a plurality of different service entities 185. A vehicle 105 can perform a vehicle service by, for example and as further described herein, travelling (e.g., traveling autonomously) to a location associated with a requested vehicle service, allowing user(s) and/or item(s) to board or otherwise enter the vehicle 105, transporting the user(s) and/or item(s), allowing the user(s) and/or item(s) to deboard or otherwise exit the vehicle 105, etc. In this way, the vehicle 105 can provide the vehicle service(s) for a service entity to a user.

It should be noted that the vehicle 105 can be or otherwise represent a simulated autonomous vehicle. More particularly, the vehicle and/or each of the components of the vehicle previously discussed (e.g., the vehicle computing system 110, the autonomy computing system 140, the sensor(s) 135, the positioning system 165, the vehicle interface 145, the vehicle control system 150, etc.) may be simulated for testing of a vehicle testing scenario. As an example, the vehicle computing system 110 can be obtain simulated input(s), and in response, provide outputs that can be utilized to measure the performance of the vehicle computing system 110. As another example, the simulations performed as described in the present disclosure may be or otherwise represent a simulation of the vehicle 105 and/or the vehicle computing system 110.

A service entity 185 can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of one or more vehicle services to one or more users. For example, a service entity can offer vehicle service(s) to users via one or more software applications (e.g., that are downloaded onto a user computing device), via a website, and/or via other types of interfaces that allow a user to request a vehicle service. As described herein, the vehicle services can include transportation services (e.g., by which a vehicle transports user(s) from one location to another), delivery services (e.g., by which a vehicle transports/delivers item(s) to a requested destination location), courier services (e.g., by which a vehicle retrieves item(s) from a requested origin location and transports/delivers the item to a requested destination location), and/or other types of services. The vehicle services can be wholly performed by the vehicle 105 (e.g., travelling from the user/item origin to the ultimate destination, etc.) or performed by one or more vehicles and/or modes of transportation (e.g., transferring the user/item at intermediate transfer points, etc.).

An operations computing system 190A of the service entity 185 can help to coordinate the performance of vehicle services by autonomous vehicles. The operations computing system 190A can include and/or implement one or more service platforms of the service entity. The operations computing system 190A can include one or more computing devices. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the operations computing system 190 (e.g., its one or more processors, etc.) to perform operations and functions, such as those described herein matching users and vehicles/vehicle fleets, deploying vehicles, facilitating the provision of vehicle services via autonomous vehicles, generating, appending, and/or otherwise utilizing a vehicle testing knowledge structure 205, performing vehicle testing simulations using the vehicle testing knowledge structure 205, etc.

A user 125 can request a vehicle service from a service entity 185. For example, the user 125 can provide user input to a user device 130 to request a vehicle service (e.g., via a user interface associated with a mobile software application of the service entity 185 running on the user device 130). The user device 130 can communicate data indicative of a vehicle service request 195 to the operations computing system 190A associated with the service entity 185 (and/or another associated computing system that can then communicate data to the operations computing system 190A). The vehicle service request 195 can be associated with a user. The associated user can be the one that submits the vehicle service request (e.g., via an application on the user device 130). In some implementations, the user may not be the user that submits the vehicle service request. The vehicle service request can be indicative of the user. For example, the vehicle service request can include an identifier associated with the user and/or the user's profile/account with the service entity 185. The vehicle service request 195 can be generated in a manner that avoids the use of personally identifiable information and/or allows the user to control the types of information included in the vehicle service request 195. The vehicle service request 195 can also be generated, communicated, stored, etc. in a secure manner to protect information.

The vehicle service request 195 can indicate various types of information. For example, the vehicle service request 194 can indicate the type of vehicle service that is desired (e.g., a transportation service, a delivery service, a courier service, etc.), one or more locations (e.g., an origin location, a destination location, etc.), timing constraints (e.g., pick-up time, drop-off time, deadlines, etc.), and/or geographic constraints (e.g., to stay within a certain area, etc.). The service request 195 can indicate a type/size/class of vehicle such as, for example, a sedan, an SUV, luxury vehicle, standard vehicle, etc. The service request 195 can indicate a product of the service entity 185. For example, the service request 195 can indicate that the user is requesting a transportation pool product by which the user would potentially share the vehicle (and costs) with other users/items. In some implementations, the service request 195 can explicitly request for the vehicle service to be provided by an autonomous vehicle or a human-driven vehicle. In some implementations, the service request 195 can indicate a number of users that will be riding in the vehicle/utilizing the vehicle service. In some implementations, the service request 195 can indicate preferences/special accommodations of an associated user (e.g., music preferences, climate preferences, wheelchair accessibility, etc.) and/or other information.

The operations computing system 190A of the service entity 185 can process the data indicative of the vehicle service request 195 and generate a vehicle service assignment that is associated with the vehicle service request. The operations computing system can identify one or more vehicles that may be able to perform the requested vehicle services to the user 195. The operations computing system 190A can identify which modes of transportation are available to a user for the requested vehicle service (e.g., light electric vehicles, human-drive vehicles, autonomous vehicles, aerial vehicle, etc.) and/or the number of transportation modes/legs of a potential itinerary of the user for completing the vehicle service (e.g., single or plurality of modes, single or plurality of legs, etc.). For example, the operations computing system 190A can determined which autonomous vehicle(s) are online with the service entity 185 (e.g., available for a vehicle service assignment, addressing a vehicle service assignment, etc.) to help identify which autonomous vehicle(s) would be able to provide the vehicle service.

The operations computing system 190A and/or the vehicle computing system 110 can communicate with one or more other computing systems 190B that are remote from the vehicle 105. This can include, for example, computing systems associated with government functions (e.g., emergency services, regulatory bodies, etc.), computing systems associated with vehicle providers other than the service entity, computing systems of other vehicles (e.g., other autonomous vehicles, aerial vehicles, etc.). Communication with the other computing systems 190B can occur via the network(s) 120.

Additionally, the operations computing system 190A can include and/or have access to a vehicle testing knowledge structure 205. The vehicle testing knowledge structure 205 can, in some implementations, be stored as any type of conventional file or data structure (e.g., a database, etc.). Alternatively, or additionally, in some implementations the vehicle testing knowledge structure 205 can be stored in a distributed fashion (e.g., stored across a plurality of computing devices and/or memories, etc.). The vehicle testing knowledge structure 205 can include one or more portions. Each of the one or more portions can include one or more tuples as previously described.

The operations computing system 190A can utilize and/or generate the vehicle testing knowledge structure 205. As an example, the operations computing system 190A can append a vehicle testing tuple (e.g., a grouping of vehicle testing parameters, etc.) to a portion of the vehicle testing knowledge structure. As another example, the operations computing system 190A can verify the vehicle testing knowledge structure 205 for generation of simulation data equivalent to data descriptive of autonomous vehicle performance. As yet another example, the operations computing system 190A can generate a portion of the vehicle testing knowledge structure 205. As such, it should be broadly understood that the operations computing system 190A can utilize or interface with the vehicle testing knowledge structure in any manner previously described in the present disclosure.

Figure 2:
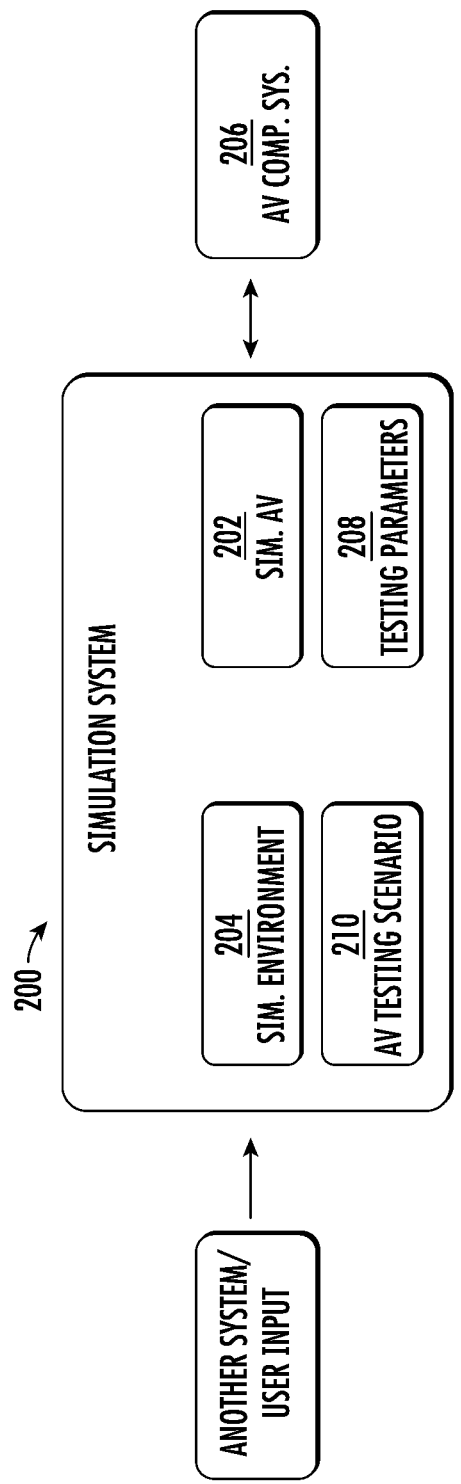
FIG. 2 depicts an example service infrastructure system according to example embodiments of the present disclosure.

The operations computing system 190A can simulate and/or facilitate simulation of autonomous driving functionality (e.g., processing operations performed by the vehicle computing system(s) 110, etc.). For example, with reference to FIG. 2, the operations computing system 190A can include, communicate with, access, etc. a simulation system 200 configured to simulate an autonomous vehicle testing scenario (e.g., using one or more corresponding vehicle testing tuples, etc.). As an example, the operations computing system 190A can utilize, communicate with, etc. a simulation system 200 to enable simulation of a simulated autonomous vehicle 202 within a simulation environment 204 including a geographic area. Various systems and devices configured to control the operation of the vehicle can be simulated. For example, a simulated autonomous vehicle 202 may include a simulation of any portion or all of an autonomous vehicle. For example, an autonomy software stack of an autonomous vehicle or other computer-based systems of the autonomous vehicle can be simulated. The autonomy software stack can include similar or the same functions as the autonomy system 140 of FIG. 1 and can be provided via an autonomous vehicle computing system 206 used for simulation. This can be utilized to generate an instance and control of a simulated autonomous vehicle 202 within the simulation environment 204. One or more instances of a simulated autonomous vehicle 202 can be provisioned and deployed at one or more computing devices (e.g., operations computing system 190A, remote computing system(s) 190B, etc.).

The simulation computing system 200 can obtain a plurality of testing parameters 208 (e.g., from a vehicle testing knowledge structure, etc.) according to a sampling rule. In some implementations, each of one or more predefined vehicle testing scenarios 210 (e.g., of corresponding scenario type(s), etc.) can be provided as a respective scenario object alongside the at least one instance of the simulated autonomous vehicle 202 in example embodiments. Using the simulation system 200, one or more vehicle service simulations can be performed using the instance of the simulated autonomous vehicle 202 and the plurality of testing parameters 208 obtained according to the sampling rule. Data indicative of simulation of the vehicle testing scenario 210 can be generated and/or stored by the simulation system. In this manner, a vehicle service-flow and/or autonomous vehicle can be quickly evaluated and debugged prior to actual deployment of an autonomous vehicle (e.g., in association with the vehicle service). In some examples, data can be exchanged using one or more testing libraries.

The simulation system 200 can obtain data defining at least one instance of a simulated autonomous vehicle. In some examples, a user (e.g., a developer, a testing engineer, etc.) and/or a third-party vehicle provider computing system (e.g., remote computing system(s) 190B, etc.) may define the at least one instance of the simulated autonomous vehicle 202 using one or more interfaces provided by the operations computing system 190A (e.g., via network(s) 120, etc.). In this manner, the user and/or third-party vehicle provider computing system (e.g., remote computing system(s) 190B, etc.) may provision a new simulated autonomous vehicle 202 to be evaluated in accordance with one or more vehicle services. The data defining the at least one instance of the simulated autonomous vehicle may include data defining one or more capabilities of the autonomous vehicle, a state of the autonomous vehicle, etc. Such information can be provided from another system in communication with the simulation system 200 and/or via user input. In some implementations, the simulation system 200 can provide simulation as a service to third-parties.

The instance(s) of the simulated autonomous vehicle 202 can be deployed as a network service in some examples, such as for one or more servers in direct communication with the operations computing system 190A (e.g., remote computing system(s) 190B, etc.). The simulated autonomous vehicle instances can be communicated with using various communication protocols (e.g., via network(s) 120, etc.). In some examples, each instance of a simulated autonomous vehicle 202 may include an interface such as an interface programmed in a software development kit (SDK) that is similar to or the same as an interface (e.g., SDK) included within an actual autonomous vehicle used to provide a vehicle service. The interface may enable the operations computing system 190A to issue instructions to the autonomous vehicle instance to accept a service request, reject a service request, update the pose field of the autonomous vehicle instance, etc.

The simulation system 200 can obtain a plurality of testing parameters 208 for simulation of a testing scenario 210 according to a sampling rule. For example, the plurality of testing parameters 208 (e.g., a tuple of parameters, etc.) may define a dispatch of a vehicle service to an instance of a simulated autonomous vehicle 202. The testing parameters 208 may also instruct the instance of the simulated autonomous vehicle 202 to accept or reject a service request. The testing parameters 208 may additionally indicate service-flow updates and/or location updates. The testing parameters may indicate a route from a pick-up location to a drop-off location in example embodiments. In some examples, the operations computing system 190A may obtain the parameters and/or the sampling rule using the simulation system 200.

The simulation system 200 can simulate testing scenarios 210 using an instantiated instance of the simulated autonomous vehicle 202. A testing scenario 210 can be simulated based at least in part on the testing parameters 208 obtained based on a sampling rule. As described previously, the testing parameters 208 can define a step (also referred to as a tick) duration, a vehicle movement strategy (e.g., no operation, move to pickup and drop-off locations, move using a constant speed and straight line, or move using a constant number of steps, etc.), vehicle callbacks (e.g., always reject, always accept, no operation, etc.), and/or a maximum number of steps. The simulation of the vehicle testing scenario 210 can result in a termination condition in response to a vehicle entering a terminal state (e.g., vehicle is offline), a vehicle performing a terminating transition (e.g., door open), a termination command being executed, or a maximum number of steps being reached.

In accordance with some aspects of the disclosed technology, the simulation system 200 may determine and store metrics for the simulation of the autonomous vehicle testing scenario 210. Example metrics may include for interface calls (e.g., programmed in an SDK): a number of succeeded method attempts; a number of failed method attempts; a latency of attempts; and/or a number of bytes in and out. Example metrics for the session may further include a vehicle state heartbeat; a state using a 1/0 gauge; an exception or equivalent (e.g., exception tag); all exceptions; and vehicle uptime.

More particularly, the simulation system 200 can be configured to generate a simulated environment 204 and simulate a testing scenario 210 within that simulated environment 204. For instance, the plurality of testing parameters 208 can be obtained based on a sampling rule. The sampling rule can be configured to emphasize a certain aspect of the testing scenario 210. As described previously, the plurality of testing parameters 208 can specify various characteristics of the simulated environment 204 that include, for example: a general type of geographic area for the simulated environment 204 (e.g., highway, urban, rural, etc.); a specific geographic area for the simulated environment 204 (e.g., beltway of City A, downtown of City B, country side of County C, etc.); one or more geographic features (e.g., trees, benches, obstructions, buildings, boundaries, exit ramps, etc.) and their corresponding positions in the simulated environment 204; a time of day; one or more weather conditions; one or more initial conditions of the simulated object(s) within the simulated environment 204 (e.g., initial position, heading, speed, etc.); a type of each simulated object (e.g., vehicle, bicycle, pedestrian, etc.); a geometry of each simulated object (e.g., shape, size etc.); one or more initial conditions of the simulated autonomous vehicle 202 within the simulated environment 204 (e.g., initial position, heading, speed, etc.); a type of the simulated autonomous vehicle 202 (e.g., sedan, sport utility, etc.); a geometry of the simulated autonomous vehicle 202 (e.g., shape, size etc.); operating condition of each simulated object (e.g., correct turn signal usage vs. no turn signal usage, functional brake lights vs. one or more brake lights that are non-functional, etc.) and/or other data associated with the simulated environment 202. The simulation system 200 can obtain the data indicative of these initial input(s) and generate the simulated environment 204 accordingly. In some implementations, one or more templates can be available for selection, which provide a standardized or otherwise pre-configured simulated environment 204 and the user can select one of the templates and optionally modify the template environment with additional user input.

The simulation system 200 can present a visual representation of the simulated environment 204 via a user interface (e.g., graphical user interface) on a display device (e.g., user device 130, etc.). The simulated environment 204 can include the simulated object and the simulated autonomous vehicle 202 (e.g., as visual representations on the user interface). For example, the simulated environment 204 can be a highway environment in which the simulated autonomous vehicle 202 is travelling in a traffic lane adjacent to a simulated object (e.g., a simulated vehicle). In another example, the simulated environment 204 can be an urban intersection environment in which the simulated autonomous vehicle 202 is travelling along a travel way that approaches a crosswalk and a simulated object (e.g., a simulated pedestrian) can be positioned near the crosswalk. The simulation system 200 and display device can operate to provide various different views of the simulated environment 204 including, as examples, a bird's eye or overhead view of the simulated environment 204, a view rendered from the vantage point of the object (e.g., from the driver's seat of the simulated object), a view rendered from the vantage point of the autonomous vehicle, and/or other views of the simulated environment 204.

The plurality of testing parameters 208 used by the simulation system 200 can specify one or more states of one or more simulated object(s) within the simulated environment 204. For instance, as a simulated object moves within the simulated environment 204 during a simulation run, the simulation system 200 (e.g., a scenario recorder) can obtain state data indicative of one or more states of the simulated object at one or more times. The state(s) can be indicative of the position(s), heading(s), speed(s), etc. of the simulated object within the simulated environment at these one or more times. The simulation system 200 can trace and/or track these state(s) to determine a motion trajectory of the simulated object that corresponds to the motion of the simulated object within the simulated environment 200.

Figure 3:
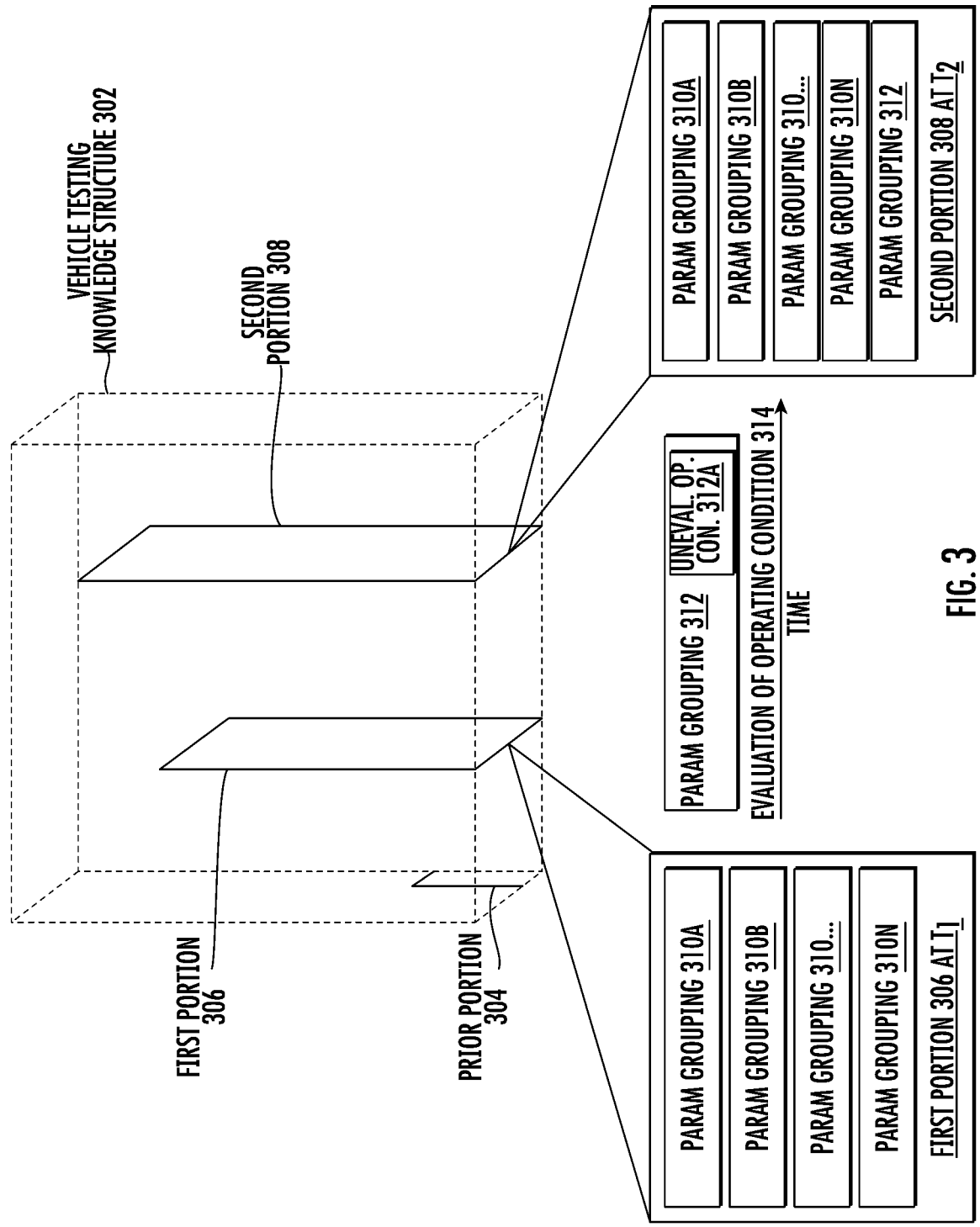
FIG. 3 depicts an example data flow diagram for generation of a portion for a vehicle testing knowledge structure according to example embodiments of the present disclosure.

FIG. 3 depicts an example data flow diagram for generation of a portion for a vehicle testing knowledge structure 302 according to example embodiments of the present disclosure. More particularly, a vehicle testing knowledge structure 302 can include a first portion 306 and a prior portion 304. The prior portion 304 can correspond to a beginning time step (e.g., a time step corresponding to instantiation and/or generation of the vehicle testing knowledge structure, etc.). The first portion 306 can correspond to a first time step subsequent to the beginning time step. The first portion 306 can include a plurality of vehicle testing parameter groupings 310A-310N. Each of the vehicle testing parameter groupings 310A-310N can include a respective plurality of vehicle testing parameters. As an example, vehicle testing parameter grouping 310A may be or otherwise include a vehicle testing tuple. The vehicle testing tuple can be or otherwise include a plurality of vehicle testing parameters. As such, it should be understood that, in some implementations, each of the vehicle testing parameter groupings 310A-310N may be or otherwise include a vehicle testing tuple.

A vehicle testing parameter grouping 312 can be obtained for the vehicle testing knowledge structure 302. The vehicle testing parameter grouping 312 (e.g., a vehicle testing tuple, a grouping of parameters utilized for vehicle testing simulation, etc.) can include a plurality of testing parameters. Each parameter of the vehicle testing parameter grouping 312 can be any parameter associated with the testing of an autonomous vehicle testing scenario. As an example, the parameters may describe environmental condition(s) for a testing scenario (e.g., humidity, sunlight, cloud coverage, weather, temperature, wind, etc.). As another example, the parameters may describe required vehicle maneuver(s) for the scenario (e.g., execution of a certain turn maneuver, acceleration, deceleration, reaction to external actor(s), perception, prediction, motion planning, etc.). As another example, the parameters may describe operational condition(s) for the testing scenario (e.g., speed limit, no-stopping zones, a number of lanes, object(s) included in a road network, lateral clearance, underbody clearance, turn radius, a degree of incline/decline, bike lanes, etc.). As yet another example, the parameters may describe a location, pose and/or behavior(s) for one or more actors included in the scenario (e.g., specifying that an actor is riding a bicycle and is not compliant with road rules, etc.).

In some implementations, the parameters of the vehicle testing parameter grouping 312 can additionally describe the scenario itself that is to be tested. As an example, the parameters of the vehicle testing parameter grouping 312 may describe a specific scenario (e.g., testing of a left turn operation for an autonomous vehicle at an intersection, etc.). Alternatively, in some implementations, the parameters of the vehicle testing parameter grouping 312 can be utilized alongside a pre-defined testing scenario. For example, the testing scenario can describe the specific scenario to be tested (e.g., testing of a right turn operation, etc.), and the parameters can describe the conditions under which the scenario takes place (e.g., number/pose/behavior of actor(s), environmental conditions, etc.).

After obtaining the vehicle testing parameter grouping 312, it can be determined that a testing parameter of the vehicle testing parameter grouping 312 is associated with an unevaluated operating condition 312A. More particularly, it can be determined that the testing parameter is associated with an operating condition 312A that has not been evaluated for operation by an autonomous vehicle. As an example, the parameter can be associated with a rare weather event that has not been evaluated for autonomous vehicle operations (e.g., an active volcano, etc.). As another example, the parameter can be associated with a rare sort of road pattern or maneuver (e.g., a type of turn maneuver that is unique to a geographic region, etc.). As yet another example, the parameter can be associated with a series of driving maneuvers that are not included in an operational design domain. In some implementations, the parameter can be determined to be associated with an unevaluated operating condition 312A of the operating condition associated with the parameter is not included in a certain autonomous vehicle safety standard (e.g., ISO 21448, SOTIF, etc.). As an example, the certain autonomous vehicle safety standard can specify a number of operating conditions under which an autonomous vehicle has been designed to operate. The operating condition 312A can be determined to be an unevaluated operating condition if the operating condition is not specified by the autonomous vehicle safety standard.

At a second time step after the first time step, an evaluation 314 of the unevaluated operating condition 312A can be performed for the parameter (e.g., using an operating condition evaluation module, etc.). As an example, the unevaluated operating condition 312A can be evaluated 314 by simulating the autonomous vehicle operating under the operating condition 312A. As another example, the unevaluated operating condition 312A can be evaluated 314 over time by operating the autonomous vehicle under the operating condition 312A. As another example, the unevaluated operating condition 312A can be evaluated 314 over time by operating and/or simulating the autonomous vehicle under conditions that are representative of the operating condition 312A.

In some implementations, to evaluate 314 the unevaluated operating condition 312A, data can be obtained that is descriptive of a performance of an autonomous vehicle operating under the unevaluated operating condition 312A. In some implementations, the data can be based at least in part on a simulation of the autonomous vehicle operating under the unevaluated operating condition 312A. As an example, a simulation can be performed that represents expected effect(s) associated with the unevaluated operating condition 312A (e.g., simulated wind conditions associated with an unevaluated tornado operating condition, etc.). In some implementations, the data can be based at least in part on sensor data from a vehicle operating under the unevaluated operating condition 312A. As an example, sensor data can be collected from a manually operated autonomous-capable vehicle (e.g., a manually operated vehicle that includes sensors sufficient to facilitate autonomous operation, etc.) that was operated under the unevaluated operating condition 312A. In some implementations, the data can include sensor data from an autonomous vehicle that operated under an evaluated operating condition that is substantially similar and/or equivalent to the unevaluated operating condition 312A. As an example, the unevaluated operating condition 312A can represent a type of inclement weather (e.g., tornado-force wind conditions, etc.). The data can include sensor data from an autonomous vehicle operating under an evaluated inclement weather operating condition substantially similar and/or equivalent to the unevaluated inclement weather operating condition 312A (e.g., hurricane-force wind conditions, etc.).

Based at least in part on the evaluation 314 of the unevaluated operating condition 312A, the unevaluated operating condition 312A can be stored as an evaluated operating condition within the vehicle testing knowledge structure 302. More particularly, in some implementations the vehicle testing knowledge structure can be utilized to evaluate 314 an unevaluated operating condition 312A. As an example, the unevaluated operating condition 312A can be or otherwise include a type of road pattern unique to a geographic region. One or more vehicle testing parameter groupings 310A-310N can be determined from the vehicle testing knowledge structure 302 that are associated with an evaluated operating condition that is substantially similar to the unevaluated operating condition 312A (e.g., a substantially similar type of road pattern). Based on simulation and/or operating performance associated with the one or more vehicle testing parameter groupings 310A-310N (e.g., a plurality of vehicle testing tuples, etc.), the unevaluated operating condition 312A can be evaluated 314. In such fashion, the vehicle testing knowledge structure 302 can be utilized to reduce the number of unevaluated operating conditions (e.g., 312A, etc.) for an autonomous vehicle without necessitating the use of significant testing and simulation expenses.

A second portion 308 can be generated for the vehicle testing knowledge structure 302 that corresponds to a second time step (e.g., subsequent to the time step associated with the first portion 306, etc.). The second portion 308 can include the vehicle testing parameter grouping 312 (and therefore the parameter associated with the previously unevaluated operating condition 312A). In some implementations, each vehicle testing parameter grouping (e.g., 310A-310N) included in a prior portion associated with a prior time step (e.g., first portion 306) of the vehicle testing knowledge structure 302 can be included in a subsequent portion (e.g., second portion 308) associated with a subsequent time step (e.g., the second time step). As depicted, the first portion 306 can include vehicle testing parameter groupings 310A-310N. After evaluating the unevaluated operating condition 312A associated with a parameter of the parameter grouping 312, a second portion 308 can be generated that includes the parameter grouping 312. Additionally, the generated second portion can include vehicle testing parameter groupings 310A-310N from the first portion 306. In such fashion, each evaluated parameter grouping from prior portion(s) (e.g., first portion 306, prior portion 304, etc.) can be included in subsequent portion(s) (e.g., second portion 308) of the vehicle testing knowledge structure 302.

Figure 4:
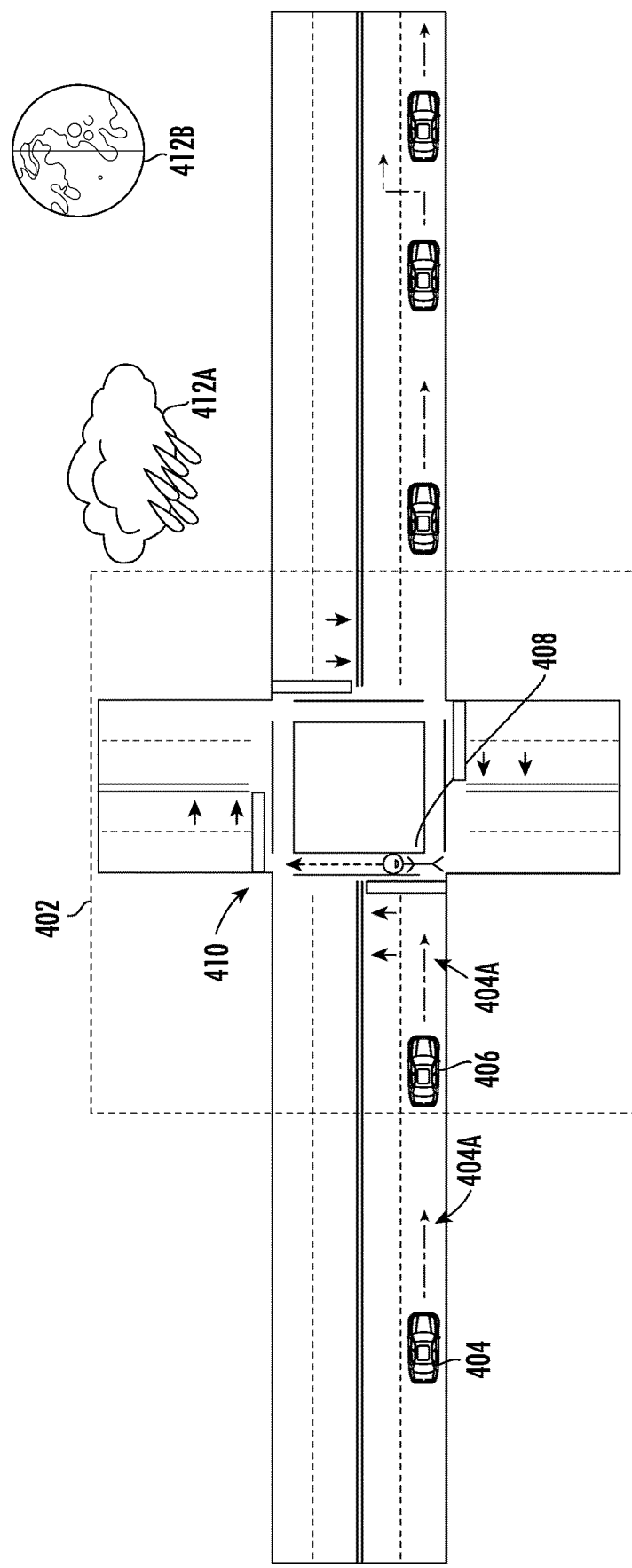
FIG. 4 depicts a data flow diagram for testing of a vehicle testing scenario using a vehicle testing tuple according to example embodiments of the present disclosure.

FIG. 4 depicts a data flow diagram for simulation and testing of a vehicle testing scenario 402 using a vehicle testing tuple according to example embodiments of the present disclosure. More particularly, the vehicle testing scenario 402 can be or otherwise describe a specific scenario to be simulated and tested (e.g., testing of a right turn operation, etc.). Additionally, or alternatively, in some implementations, the scenario 402 can be a scenario of a certain scenario type. Vehicle testing parameters (e.g., the parameters included in vehicle testing parameter grouping 310A of FIG. 3, etc.) can describe the conditions under which the scenario 402 takes place (e.g., number/pose/behavior of actor(s), environmental conditions, etc.). As depicted, the vehicle testing scenario 402 can depict a simulated scenario in which an autonomous vehicle 406 navigates an intersection 410. Vehicle testing parameters associated with the vehicle testing scenario 402 can specify one or more conditions in which the simulation of the vehicle testing scenario 402 takes place (e.g., rain conditions 412A, night-time conditions 412B, etc.).

As an example, the vehicle testing parameters (e.g., parameters of a vehicle testing tuple, etc.) can describe a location, pose, and behavior of a testing entity 408. As depicted, the testing entity 408 can be located in the southwest corner of the intersection 410, and can face the northwest corner of the intersection 410. Additionally, the parameters can describe a behavior of the testing entity 408 such that the testing entity 408 crosses the intersection 410 in a non-compliant manner (e.g., crossing when crosswalk signage indicates not to cross, etc.). The parameters can also specify a number of additional testing entities. For example, the parameters can specify a vehicle entity 404 located behind the vehicle 406. More particularly, the parameters can specify that the vehicle entity 404 is located behind the vehicle 406, and can describe a movement vector 404A for the vehicle entity 406 alongside any relevant behaviors for the vehicle entity 406.

The parameters (e.g., the parameters included in vehicle testing parameter grouping 310A of FIG. 3, etc.) can specify any number of environmental conditions for the scenario 402. As an example, the parameters can specify rain conditions 412A. As another example, the parameters can specify a time of day and any associated lighting conditions (e.g., night-time conditions 412B, etc.). Additionally, the parameters can describe a certain quantity or level for each of the environmental conditions. For example, the parameters may specify a very heavy rainfall condition 412A. As such, the parameters (e.g., the parameters included in vehicle testing parameter grouping 310A of FIG. 3, etc.) can broadly describe any aspect or characteristic for the simulation of the vehicle testing scenario 402.

In some implementations, the vehicle testing scenario 402 can be or otherwise represent an unknown testing scenario 402. More particularly, data can be obtained that describes a scenario type for the scenario 402 that an autonomous vehicle (e.g., simulated vehicle 404, etc.) has not yet operated under and/or has not yet been designed to operate under (e.g., not included in an operational design domain, etc.). To follow the illustrated example of FIG. 4, the unknown scenario type for scenario 402 can describe a specific form of non-compliant behavior for a pedestrian 408 (e.g., a testing entity, etc.) entering an intersection 410. For example, the scenario type for the scenario 402 may represent a scenario type in which the pedestrian 408 does leave the intersection 410 after entering (e.g., a particular type of non-compliance, etc.).

In some implementations, a known scenario type for the scenario 402 (e.g., as represented by one or more vehicle testing tuples, etc.) can be determined to be similar to the unknown scenario type for scenario 402. To follow the previously described example, it can be determined (e.g., based on simulation data associated with the known scenario type, etc.) that one or more other known scenario types associated with avoidance of an object or obstruction in an intersection 410 is similar to the unknown scenario type for scenario 402. Vehicle testing tuple(s) (e.g., groupings of parameters, etc.) of a vehicle testing knowledge structure (e.g., the vehicle testing knowledge structure 302 of FIG. 3, etc.) that are associated with the known scenario type can include parameters that describe various operating conditions for the known scenario type.

As an example, the scenario 402 can first be simulated using one or more vehicle testing tuples of an unknown scenario type in which the pedestrian 408 does not exit the intersection 410. Simulation data can be obtained that describes the performance of the autonomous vehicle 406 for the simulation. Next, the scenario 402 can be simulated using one or more vehicle testing tuples of the known scenario type in which a stationary object obstructs the intersection 410. Additional simulation data can be generated, and the results from the two scenario types can be compared to determine that the two scenario types are similar. More particularly, after determining that the known scenario type is similar to the unknown scenario type for scenario 402, it can be determined that simulation of autonomous vehicle performance for the known scenario type is functionally equivalent to simulation of autonomous vehicle performance for the unknown scenario type for scenario 402. As such, simulation of the known scenario type for scenario 402 using the associated vehicle testing tuple can generate simulation data that describes the performance of the vehicle 402 for both the known scenario type and the unknown scenario type of scenario 402. In such fashion, the need to simulate exceedingly rare scenario types can be obviated by determining a functional equivalent simulation type, therefore significantly reducing the number of scenario types required to be simulated.

Figure 5:
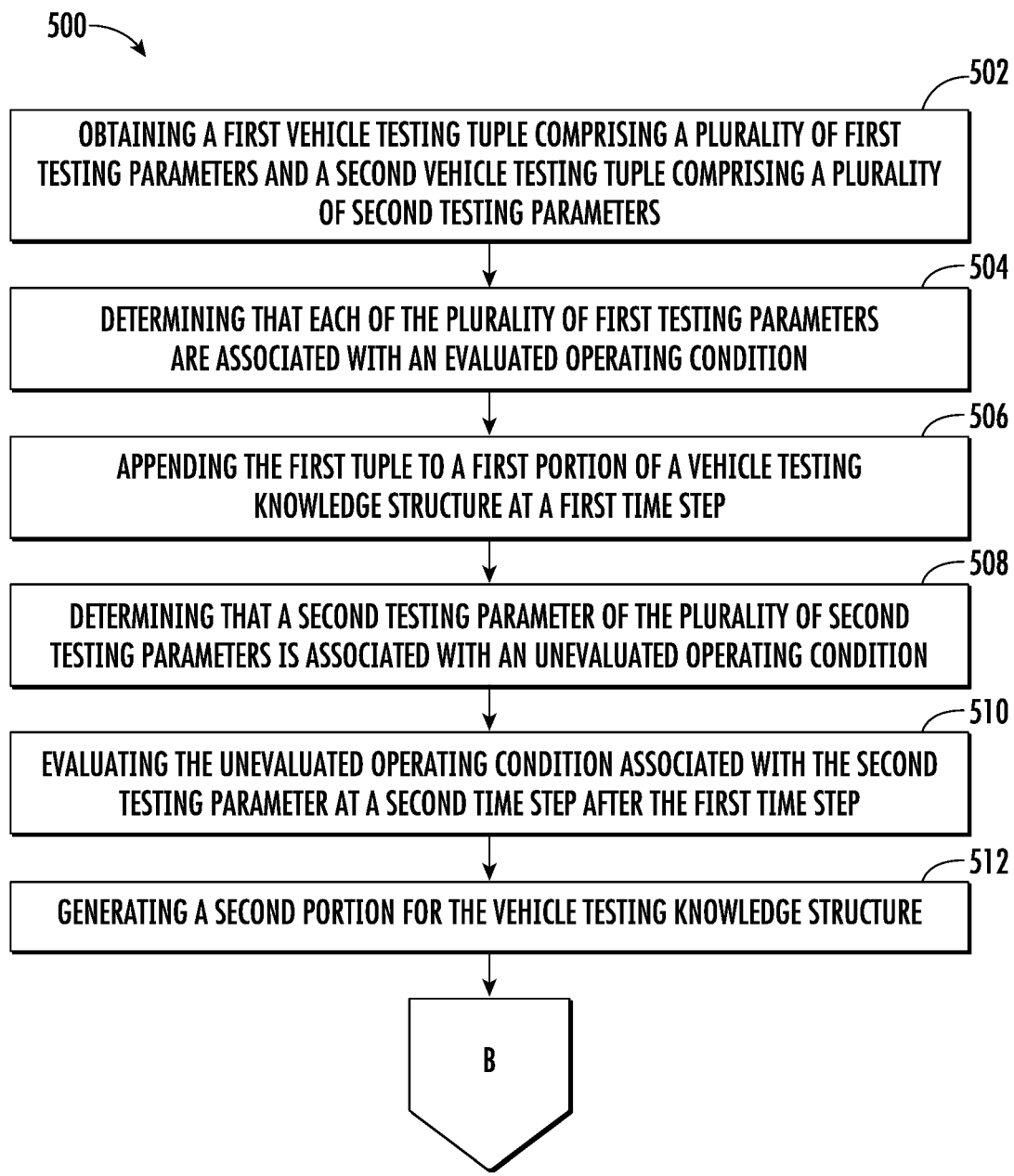
FIG. 5 depicts a flowchart of a method for generating a portion for a vehicle testing knowledge structure according to example embodiments of the present disclosure.

FIG. 5 depicts a flowchart of a method 500 for generating a portion for a vehicle testing knowledge structure according to example embodiments of the present disclosure. One or more portion(s) of the method 500 can be implemented by one or more computing devices such as, for example, the computing devices described in FIGS. 1, 2, 7, and 8. Moreover, one or more portion(s) of the method 500 can be implemented as an algorithm on the hardware components of the device(s) described herein (e.g., as in FIGS. 1, 2, 7, and 8) to, for example, generate a portion for a vehicle testing knowledge structure. FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (502), the method 500 can include obtaining a first vehicle testing tuple comprising a plurality of first testing parameters and a second vehicle testing tuple comprising a plurality of second testing parameters. For instance, a computing system (e.g., service entity computing system 190A) can obtain a first vehicle testing tuple and second vehicle testing tuple. The first vehicle testing tuple (e.g., a vehicle testing parameter grouping, a grouping of parameters utilized for vehicle testing simulation, etc.) can include a plurality of first testing parameters, and the second vehicle testing tuple can include a plurality of second testing parameters. The parameters of the vehicle testing tuples can be any parameter associated with the testing of an autonomous vehicle testing scenario. As an example, the parameters may describe environmental condition(s) for a testing scenario (e.g., humidity, sunlight, cloud coverage, weather, temperature, wind, etc.). As another example, the parameters may describe required vehicle maneuver(s) for the scenario (e.g., execution of a certain turn maneuver, acceleration, deceleration, reaction to external actor(s), perception, prediction, motion planning, etc.). As another example, the parameters may describe operational condition(s) for the testing scenario (e.g., speed limit, no-stopping zones, a number of lanes, object(s) included in a road network, lateral clearance, underbody clearance, turn radius, a degree of incline/decline, bike lanes, etc.). As yet another example, the parameters may describe a location, pose and/or behavior(s) for one or more actors included in the scenario (e.g., specifying that an actor is riding a bicycle and is not compliant with road rules, etc.). For example, the parameters may describe an actor located at the sidewalk of an intersection, and who's behavior includes facing the intersection and walking into the intersection at predetermined time. As such, the parameters included in vehicle testing tuples can broadly describe any possible detail of a "real-world" testing scenario that is being simulated.

In some implementations, the parameters of the vehicle testing tuples can additionally describe the scenario itself that is to be tested. As an example, the parameters of the tuple may describe a specific scenario (e.g., testing of a left turn operation for an autonomous vehicle at an intersection, etc.). Alternatively, in some implementations, the parameters of the vehicle testing tuples can be utilized alongside a pre-defined testing scenario. For example, the testing scenario can describe the specific scenario to be tested (e.g., testing of a right turn operation, etc.), and the parameters can describe the conditions under which the scenario takes place (e.g., number/pose/behavior of actor(s), environmental conditions, etc.).

At (504), the method 500 can include determining that each of the plurality of first testing parameters are associated with an evaluated operating condition. For instance, once the first and second vehicle testing tuples are obtained, a computing system (e.g., service entity computing system 190A) can determine that each of the plurality of first testing parameters are associated with an evaluated operating condition. More particularly, it can be determined that each of the first testing parameters is associated with an operating condition in which an autonomous vehicle can operate within or can be expected to operate within (e.g., a condition included in an operational design domain (ODD), etc.). As an example, a parameter of the plurality of first testing parameter can be associated with a heavy rain operating condition. It can be determined that the heavy rain operating condition is an evaluated operating condition (e.g., an autonomous vehicle has been evaluated to operate under a heavy rain operating condition, etc.). In such fashion, it can be determined (e.g., by a computing system, a service entity computing system, etc.) that each of the plurality of first testing parameters is associated with an operating condition that has been evaluated previously.

In some implementations, at least some of the plurality of parameters of a vehicle testing tuple (e.g., the first vehicle testing tuple, the second vehicle testing tuple, etc.) can be or otherwise correspond to a testing standard and/or a set of standardized testing parameters. As an example, at least some parameters of a plurality of testing parameters can be or otherwise correspond to a certain safety standard (e.g., ISO 21448, SOTIF, etc.). As another example, a parameter from a vehicle testing tuple can be or otherwise be associated with an evaluated testing parameter if the parameter is associated with operations included in a safety standard (e.g., ISO 21448, SOTIF, etc.). In some implementations, a safety standard can be utilized to determine whether an operating condition is an evaluated operating condition, and/or if a testing parameter is associated with an evaluated operating condition. As an example, a safety standard (e.g., ISO 21448, SOTIF, etc.), or an operational design domain, can specify a plurality of operating conditions (e.g., certain vehicle maneuvers, environmental conditions, behaviors, etc.) for which an autonomous vehicle can operate (e.g., conditions in which the vehicle is designed to operate, etc.). Each of the first plurality of testing parameters can be determined to be associated with an evaluated operating condition by comparing each of the testing parameters to the evaluated operating conditions specified by the certain safety standard. In such fashion, a testing parameter can be determined to be associated with a condition that has been evaluated for operation by an autonomous vehicle.

At (506), the method 500 can include appending the first tuple to a first portion of a a vehicle testing knowledge structure at a first time step. For instance, a computing system (e.g., service entity computing system 190A) can append the first tuple to a first portion of a vehicle testing knowledge structure at a first time step (e.g., a representation of a specific moment in time, etc.). The vehicle testing knowledge structure (e.g., a data structure, database, model, etc.) can be or otherwise include a plurality of these portions, and each portion of the structure can include one or more vehicle testing tuples. Additionally, each portion of the vehicle testing knowledge structure can correspond to a respective time step. More particularly, the vehicle testing knowledge structure can include or otherwise represent the development of evaluated vehicle testing tuples over a plurality of time steps. As an example, one portion of the vehicle testing knowledge structure can include each vehicle testing tuple that had been utilized for autonomous vehicle systems testing up to a time step that corresponds to the portion. An additional portion that corresponds to a subsequent time step can include each of the vehicle testing tuples of the previous portion in addition to one or more new vehicle testing tuples that had been utilized for autonomous vehicle systems testing subsequent to the first time step. In such fashion, the vehicle testing knowledge structure can represent and/or include the advancement over time of autonomous vehicle systems testing parameters, and can also facilitate the usage of such representation for additional testing and validation of autonomous vehicle system performance.

It should be noted that "first" and "second" are referred to in the present disclosure with regards to portions and time steps merely to differentiate the portions and time steps described. More particularly, it should not be assumed that the terms "first portion" or "second portion" describe any particular placement or ordering of the portions within the vehicle testing knowledge structure. As an example, one or more portions can be included in the vehicle testing knowledge structure that are respectively associated with one or more time steps occurring prior to the first time step. As another example, one or more portions can be included in the vehicle testing knowledge structure that are respectively associated with one or more time steps occurring subsequently to the first time step and prior to the second time step corresponding to the second portion.

At (508), the method 500 can include determining that a second testing parameter of the plurality of second testing parameters is associated with an unevaluated operating condition. For instance, a computing system (e.g., service entity computing system 190A) can determine that second testing parameter of the plurality of second testing parameters can be associated with an unevaluated operating condition. More particularly, it can be determined that one of the plurality of second testing parameters is associated with an operating condition that has not been evaluated for operation by an autonomous vehicle. As an example, the parameter can be associated with a rare weather event that has not been evaluated for autonomous vehicle operations (e.g., an active volcano, etc.). As another example, the parameter can be associated with a rare sort of road pattern or maneuver (e.g., a type of turn maneuver that is unique to a geographic region, etc.). As yet another example, the parameter can be associated with a series of driving maneuvers that are not included in an operational design domain. In some implementations, the parameter can be determined to be associated with an unevaluated operating condition of the operating condition associated with the parameter is not included in a certain autonomous vehicle safety standard (e.g., ISO 21448, SOTIF, etc.). As an example, the certain autonomous vehicle safety standard can specify a number of operating conditions under which an autonomous vehicle has been designed to operate. The operating condition can be determined to be an unevaluated operating condition if the operating condition is not specified by the autonomous vehicle safety standard.

At (510), the method 500 can include evaluating the unevaluated operating condition associated with the second testing parameter at a second time step after the first time step. For instance, at a second time step after the first time step, a computing system (e.g., service entity computing system 190A) can evaluate the unevaluated operating condition associated with the second testing parameter. As an example, the unevaluated operating condition can be evaluated by simulating the autonomous vehicle operating under the operating condition. As another example, the unevaluated operating condition can be evaluated by operating the autonomous vehicle under the operating condition. As another example, the unevaluated operating condition can be evaluated by operating and/or simulating the autonomous vehicle under conditions that are representative of the operating condition.

In some implementations, to evaluate the unevaluated operating condition, data can be obtained that is descriptive of a performance of an autonomous vehicle operating under the unevaluated operating condition. In some implementations, the data can be based at least in part on a simulation of the autonomous vehicle operating under the unevaluated operating condition. As an example, a simulation can be performed that represents expected effect(s) associated with the unevaluated operating condition (e.g., simulated wind conditions associated with an unevaluated tornado operating condition, etc.). In some implementations, the data can be based at least in part on sensor data from a vehicle operating under the unevaluated operating condition. As an example, sensor data can be collected from a manually operated autonomous-capable vehicle (e.g., a manually operated vehicle that includes sensors sufficient to facilitate autonomous operation, etc.) that was operated under the unevaluated operating condition. In some implementations, the data can include sensor data from an autonomous vehicle that operated under an evaluated operating condition that is substantially similar and/or equivalent to the unevaluated operating condition. As an example, the unevaluated operating condition can represent a type of inclement weather (e.g., tornado-force wind conditions, etc.). The data can include sensor data from an autonomous vehicle operating under an evaluated inclement weather operating condition substantially similar and/or equivalent to the unevaluated inclement weather operating condition (e.g., hurricane-force wind conditions, etc.).

Based at least in part on the data, the unevaluated operating condition can be stored as an evaluated operating condition within the vehicle testing knowledge structure. More particularly, in some implementations the vehicle testing knowledge structure can be utilized to evaluate an unevaluated operating condition. As an example, the unevaluated operating condition can be or otherwise include a type of road pattern unique to a geographic region. One or more vehicle testing tuples can be determined from the vehicle testing knowledge structure that are associated with an evaluated operating condition that is substantially similar to the unevaluated operating condition (e.g., a substantially similar type of road pattern). Based on simulation and/or operating performance associated with the one or more vehicle testing tuples, the unevaluated operating condition can be evaluated. In such fashion, the vehicle testing knowledge structure can be utilized to reduce the number of unevaluated operating conditions for an autonomous vehicle without necessitating the use of significant testing and simulation expenses.

At (512), the method 500 can include generating a second portion for the vehicle testing knowledge structure. For instance, a computing system (e.g., service entity computing system 190A) can generate a second portion for the vehicle testing knowledge structure that corresponds to the second time step (e.g., subsequent to appending the first tuple to the first portion of the vehicle testing knowledge structure, etc.). The second portion can include the second vehicle testing tuple. In some implementations, each vehicle testing tuple included in a prior portion associated with a prior time step (e.g., the first portion) of the vehicle testing knowledge structure can be included in a subsequent portion associated with a subsequent time step (e.g., the second portion). As an example, the first portion can include the first vehicle testing tuple and any vehicle testing tuple(s) included in any portion(s) of the vehicle testing knowledge structure associated with time steps prior to the first time step. The second portion of the vehicle testing knowledge structure can include the second vehicle testing tuple, and can also include the first vehicle testing tuple and any other vehicle testing tuples included in the first portion.

Figure 6A:
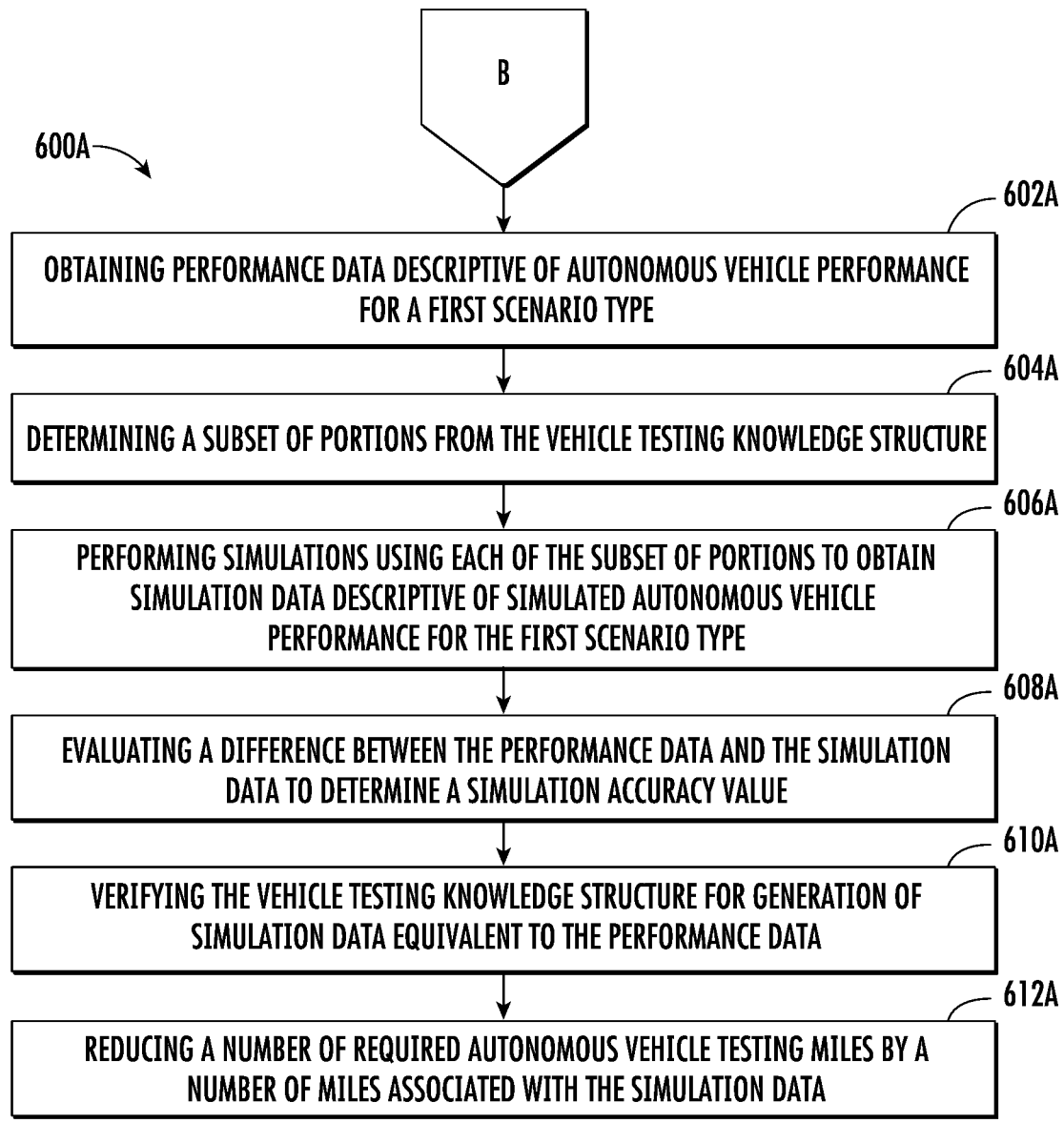
FIG. 6A depicts a flowchart of a method for validating the simulation accuracy of a vehicle testing knowledge structure according to example embodiments of the present disclosure.

FIG. 6A depicts a flow diagram of an example method 600A for validating the simulation accuracy of a vehicle testing knowledge structure according to example embodiments of the present disclosure. One or more portion(s) of the method 600A can be implemented by one or more computing devices such as, for example, the computing devices described in FIGS. 1, 2, 7, and 8. Moreover, one or more portion(s) of the method 600A can be implemented as an algorithm on the hardware components of the device(s) described herein (e.g., as in FIGS. 1, 2, 7, and 8) to, for example, validate the simulation accuracy of a vehicle testing knowledge structure. FIG. 6A depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. Additionally, it should be understood that each of the steps described in method 600A may be performed subsequently to the steps as previously described in FIG. 5. Alternatively, in some implementations, each of the steps described in method 600A may be performed discretely from those previously described in FIG. 5.

At (602A), the method 600A can include obtaining performance data descriptive of autonomous vehicle performance for a first scenario type. For instance, a computing system (e.g., service entity computing system 190A) can obtain performance data descriptive of autonomous vehicle performance for a first scenario type. The first scenario type can be or otherwise include a type of scenario (e.g., a type and/or series of maneuver(s), behavior(s), environmental condition(s), actor behavior(s), traffic pattern(s), signage, etc.). As an example, the first scenario type may be a type of scenario in which an autonomous vehicle comes to a stop at an intersection in response to a pedestrian entering the intersection. As another example, the first scenario type may be a type of scenario in which an autonomous adjusts the positioning of the autonomous vehicle within a lane of a transportation network in response to a prediction of a second vehicle entering the space currently occupied by the autonomous vehicle. As such, it should be noted that a scenario type can broadly describe an operating situation for an autonomous vehicle to any desired degree of specificity.

The performance data can be or otherwise include real-world data from one or more autonomous vehicles operating under various conditions for the first scenario type. To follow the previously described example, the first scenario type can be a type of scenario in which an autonomous vehicle adjusts the positioning of itself within a lane of a transportation network in response to a prediction of a second vehicle entering the space currently occupied by the autonomous vehicle. The performance data can describe a real-world response of autonomous vehicles to the first scenario type under various operating conditions (e.g., environmental conditions, different actor behaviors, different levels of occlusion of surrounding actors, etc.). As such, the performance data can describe real-world data from a plurality of autonomous vehicles operating in the first scenario type under a varied number and type of operating conditions.

At (604A), the method 600A can include determining a subset of portions from the vehicle testing knowledge structure. For instance, a computing system (e.g., service entity computing system 190A) can determine a subset of portions from the plurality of portions of the vehicle testing knowledge structure. Each of the subset of portions can include one or more vehicle testing tuples associated with the first scenario type. To follow the previously described example, the one or more vehicle testing tuples of each of the subset of portions can respectively include a plurality of parameters representative of various conditions for testing the type of scenario in which the autonomous vehicle comes to a stop at the intersection in response to the pedestrian entering the intersection. For example, a first vehicle testing tuple can include parameters that specify that the scenario takes place at night during moderate rain. A second testing tuple can include parameters that specify the scenario takes place at day during clear conditions. A third testing tuple can include parameters that specify a distance from the pedestrian and the autonomous vehicle, and an amount of occlusion between the autonomous vehicle and the pedestrian caused by one or more additional vehicles. As such, each of the one or more vehicle testing tuples of the subset of portions can respectively describe a different testing variation for the first type of scenario.

At (606A), the method 600A can include performing simulations using each of the subset of portions to obtain simulation data descriptive of simulated autonomous vehicle performance for the first scenario type. For instance, a computing system (e.g., service entity computing system 190A) can perform simulations using the vehicle testing tuple(s) of each of the subset of portions to obtain simulation data. The simulation data can describe simulated autonomous vehicle performance for the first scenario type. To follow the previously described example, the simulation data can describe how the autonomous vehicle performed under the conditions specified by each of the one or more vehicle testing tuples included in the subset of portions (e.g., performance under various environmental conditions, different actor behaviors, etc.).

At (608A), the method 600A can include evaluating a difference between the performance data and the simulation data to determine a simulation accuracy value. For instance, a computing system (e.g., service entity computing system 190A) can evaluate a difference between the data descriptive of the autonomous vehicle performance and the simulation data. Based on the evaluation, a simulation accuracy value can be determined that indicates a simulation accuracy for the first scenario type by the vehicle testing knowledge structure. As an example, it can be determined that the performance of the autonomous vehicle described by the performance data is identical or substantially similar to the performance of the autonomous vehicle described by the simulation data. The simulation accuracy value can indicate that the simulation accuracy of the vehicle testing knowledge structure is sufficiently accurate as to generate simulation data that is equivalent to real-world performance data for the first scenario type.

At (610A), the method 600A can include verifying the vehicle testing knowledge structure for generation of simulation data equivalent to the performance data. For instance, a computing system (e.g., service entity computing system 190A) can verify the simulation accuracy of the vehicle testing knowledge structure for the first scenario type based at least in part on the simulation accuracy value. More particularly, the vehicle testing knowledge structure can be verified for generation of simulation data that is equivalent to the data descriptive of autonomous vehicle performance (e.g., real-world performance, etc.) for the first scenario type. As an example, the simulation accuracy value can indicate that the simulated performance data is identical or substantially similar to the performance data of the autonomous vehicle for the first scenario type (e.g., the real-world performance data for the first scenario type). Based at least in part on the accuracy of the vehicle testing knowledge structure, it can be determined that simulation data generated using the vehicle testing knowledge structure is functionally equivalent to real-world performance data for the autonomous vehicle.

At (612A), the method 600A can include reducing a number of required autonomous vehicle testing miles by a number of miles associated with the simulation data. For instance, a computing system (e.g., service entity computing system 190A) can reduce a number of required autonomous vehicle testing miles by a number of miles associated with the simulation data. More particularly, a "miles traveled" goal specified by certain safety standards can be met at least in part using the verified simulation data of the vehicle testing knowledge structure. As an example, certain autonomous vehicle safety standards (e.g., SOTIF criteria, ISO 21448, etc.), as well as conventional standards within the autonomous vehicle industry, specify that an autonomous vehicle must travel a required number of miles (e.g., 6 billion miles, etc.) to properly certify the safety and performance of the autonomous vehicle. However, such a quantity of miles is generally considered to be prohibitively difficult to perform. By verifying the simulated performance of an autonomous vehicle using the vehicle testing knowledge structure as equivalent to performance of "real-world" miles by an autonomous vehicle, the vehicle testing knowledge structure can be utilized to facilitate generation of performance data that satisfies the required number of miles specified by various safety standards.

Figure 6B:
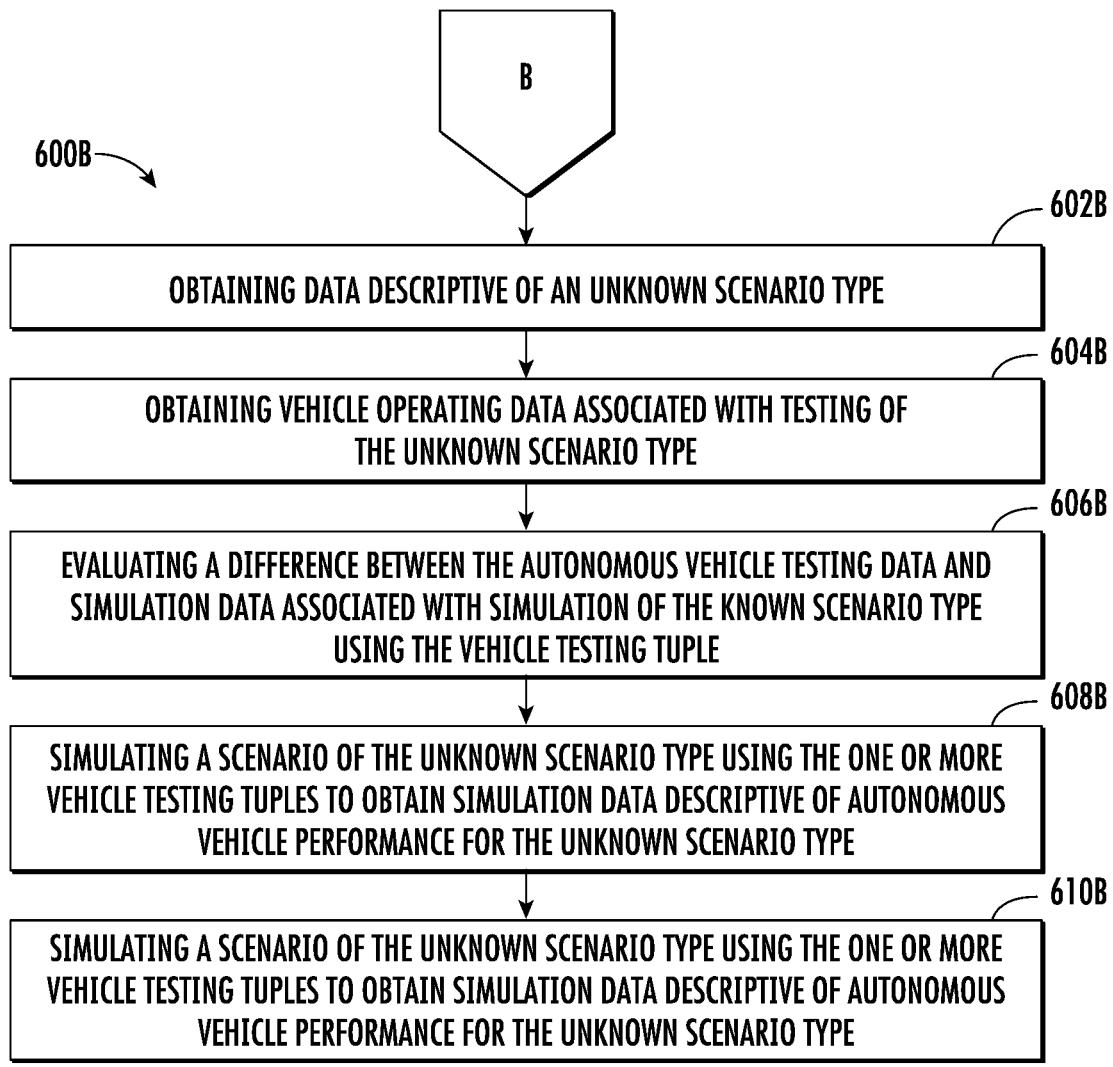
FIG. 6B depicts a flowchart of a method for evaluating an unknown vehicle testing scenario using a vehicle testing knowledge structure according to example embodiments of the present disclosure.

FIG. 6B depicts a flow diagram of an example method 600B for evaluating an unknown vehicle testing scenario using a vehicle testing knowledge structure according to example embodiments of the present disclosure. One or more portion(s) of the method 600B can be implemented by one or more computing devices such as, for example, the computing devices described in FIGS. 1, 2, 7, and 8. Moreover, one or more portion(s) of the method 600B can be implemented as an algorithm on the hardware components of the device(s) described herein (e.g., as in FIGS. 1, 2, 7, and 8) to, for example, evaluate an unknown vehicle testing scenario using a vehicle testing knowledge structure. FIG. 6B depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

It should be understood that each of the steps described in method 600b may be performed subsequently to the steps as previously described in FIG. 5. Alternatively, in some implementations, each of the steps described in method 600B may be performed discretely from those previously described in FIG. 5. Additionally, or alternatively, in some implementations the steps described in method 600B may be performed prior to, subsequent to, and/or concurrently with the steps described in method 600A of FIG. 6A.

At (602B), the method 600B can include obtaining data descriptive of an unknown scenario type. For instance, a computing system (e.g., service entity computing system 190A) can obtain data descriptive of an unknown scenario type. More particularly, data can be obtained that describes a scenario type that an autonomous vehicle has not yet operated under and/or has not yet been designed to operate under (e.g., not included in an operational design domain, etc.). As an example, the unknown scenario type may describe a series of maneuvers required to utilize a certain type of transportation infrastructure unique to a geographic region (e.g., a "jughandle" turn that is generally found only in New Jersey, U.S.A, etc.). As another example, the unknown scenario type may describe a series of maneuvers required to avoid a rarely occurring type of natural disaster (e.g., a series of maneuvers and/or behaviors performed to avoid environmental conditions resulting from a volcanic eruption, etc.).

At (604B), the method 600B can include determining that a known scenario type is similar to the unknown scenario type. For instance, a computing system (e.g., service entity computing system 190A) can determine that a known scenario type represented by one or more vehicle testing tuples is similar to the unknown scenario type. To follow the previously described example of step 602B, it can be determined (e.g., based on simulation data associated with the known scenario type, etc.) that one or more other known scenarios associated with traversal of an on-ramp for a highway and/or performance of a left turn maneuver are substantially similar to an unknown scenario type associated with a "jughandle" turn that is only used in a certain geographic region. Vehicle testing tuple(s) of the vehicle testing knowledge structure that are associated with the known scenario type can include parameters that describe various operating conditions for the known scenario type. As another example, the unevaluated scenario type can describe or otherwise include a plurality of autonomous vehicle maneuvers (e.g., entering a specific type of on-ramp unique to a geographic region, performing a standard left turn, entering a standard off-ramp, etc.), and the evaluated scenario type can include a subset of the plurality of autonomous vehicle maneuvers (e.g., entering a standard type of on-ramp, performing a standard left turn, entering a standard off-ramp, etc.).

In some implementations, determining that the known scenario type is similar to the unknown scenario type can include obtaining vehicle operating data associated with testing of the unknown scenario type. As an example, the operating data can be or otherwise include sensor data from a vehicle (e.g., an autonomous vehicle, a manually operated vehicle, etc.) operating under the unknown scenario type. To follow the previous example, the vehicle operating data can describe performance of the vehicle and/or any maneuvers performed while navigating a "jughandle" turn. As another example, the operating data can be data descriptive of a simulation of a vehicle performing maneuvers to navigate a "jughandle" turn. It should be noted that the operating data is not necessarily data that is obtained from the sensors of a vehicle. Rather, the operating data can also be data that describes an expected series of maneuvers that are required to operate under the unknown testing scenario.

At (606B), the method 600B can include evaluating a difference between the autonomous vehicle testing data and simulation data associated with simulation of the known scenario type using the vehicle testing tuple. For instance, a computing system (e.g., service entity computing system 190A) can determine that the known scenario type is similar or equivalent to the unknown scenario type by evaluating a difference between the autonomous vehicle testing data and simulation data associated with simulation of the known scenario type using the one or more vehicle testing tuples. More particularly, simulation data that was previously generated using the one or more vehicle testing tuples can be utilized to determine the similarity between the unknown scenario type and the known scenario type. As an example, the unknown scenario type can describe a series of maneuvers required to utilize a certain type of transportation infrastructure unique to a geographic region (e.g., a "jughandle" turn that is mostly found in New Jersey, U.S., etc.). The known scenario type can describe a series of maneuvers required to utilize a standard type of transportation infrastructure (e.g., entering an on-ramp followed by a left turn, etc.). A difference can be evaluated between the previously generated simulation data for the known scenario type and the operating data for the unknown scenario type. Based on this difference, it can be determined that the known scenario type represented by the one or more vehicle testing tuples is equivalent to the unknown scenario type.

At (608B), the method 600B can include simulating a scenario of the unknown scenario type using the one or more vehicle testing tuples to obtain simulation data descriptive of autonomous vehicle performance for the unknown scenario type. For instance, a computing system (e.g., service entity computing system 190A) can simulate the scenario of the unknown scenario type using the vehicle testing tuple associated with the known scenario type to obtain simulation data. The simulation data can describe autonomous vehicle performance for the unknown scenario type. More particularly, after determining that the known scenario type is similar to the unknown scenario type, it can be determined that simulation of the known scenario type using the vehicle testing knowledge structure is functionally equivalent to simulation of autonomous vehicle performance for the unknown scenario type. As such, simulation of the known scenario type using the associated vehicle testing tuple can generate simulation data that describes autonomous vehicle performance for both the known scenario type and the unknown scenario type. In such fashion, the need to simulate exceedingly rare scenario types can be obviated by determining a functional equivalent simulation type included in the vehicle testing knowledge structure, therefore significantly reducing the number of scenario types required to be simulated.

In some implementations, a first known scenario type can be determined to be equivalent to a second known scenario type. More particularly, the performance of an autonomous vehicle (e.g., action(s), behavior(s), etc.) under a first known scenario type can be determined to be equivalent to the performance of the autonomous vehicle while operating under the second known scenario type. As an example, a first known scenario type can describe a series of driving maneuvers required to navigate the autonomous vehicle through a scenario in which law enforcement are pursuing a cyclist. A second known scenario type can describe a series of driving maneuvers required to navigate the autonomous vehicle through a scenario in which a cyclist does not comply with road rules (e.g., not utilizing a bike lane, ignoring signage, etc.). Vehicle testing tuples can be obtained from the vehicle testing knowledge structure that are associated with both the first known scenario type and the second known scenario type. The vehicle testing tuples can be utilized to simulate the first known scenario type and the second known scenario type to obtain first scenario simulation data and second scenario simulation data. Based on a comparison between the first scenario simulation data and the second scenario simulation data, it can be determined that operation by the autonomous vehicle under the first scenario type is functionally equivalent to operation by the autonomous vehicle under the second scenario type. To follow the previously described example, it can be determined that the operation of the autonomous vehicle to navigate around pursuit of the cyclist (e.g., action(s), decision(s), behavior(s), etc.) is functionally equivalent to the operation of the autonomous vehicle to navigate around the non-compliant cyclist.

In some implementations, in response to determining that the first known scenario type is equivalent to the second known scenario type, the second known testing scenario can be eliminated from the vehicle testing knowledge structure. More particularly, vehicle testing tuples of the portion(s) of the vehicle testing knowledge structure associated with the second known scenario type can be associated with the first scenario type, and the second scenario type can be eliminated. Additionally, in some implementations, the first known scenario type can be adjusted (e.g., a description of the first scenario type, etc.) to indicate that the first known scenario type is also representative of the second known scenario type. In such fashion, known scenario type(s) of the vehicle testing knowledge structure can be evaluated and merged if substantially similar, therefore significantly reducing a total computational simulation cost associated with simulation of each known scenario type.

Figure 7:
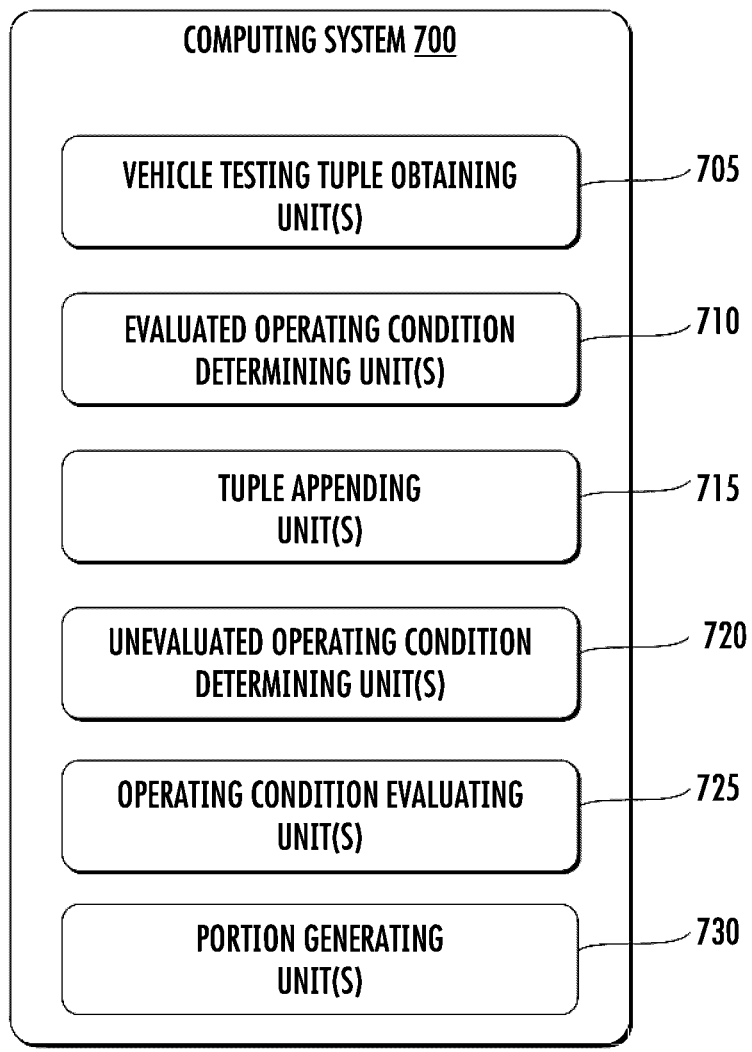
FIG. 7 depicts example system units for performing operations and functions according to example embodiments of the present disclosure.

Various means can be configured to perform the methods and processes described herein. FIG. 7 depicts example units associated with a computing system for performing operations and functions according to example embodiments of the present disclosure. As depicted, FIG. 7 depicts a computing system 700 that can include, but is not limited to, vehicle testing tuple obtaining unit(s) 705; evaluated operating condition determining unit(s) 710; tuple appending unit(s) 715; unevaluated operating condition determining unit(s) 720; operating condition evaluating unit(s) 725; and portion generating unit(s) 730.

In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein (including the claims).

The means can be programmed to perform one or more algorithm(s) for carrying out the operations and functions described herein. For instance, the means can be configured to obtain a first vehicle testing tuple and a second vehicle testing tuple (e.g., respective pluralities of testing parameters for testing of a vehicle testing scenario, etc.). A vehicle testing tuple obtaining unit 705 is an example of means for obtaining a first vehicle testing tuple and a second vehicle testing tuple as described herein.

The means can be configured to determine whether each of a plurality of testing parameters are associated with an evaluated operating condition. For example, the means can be configured to determine that each parameter of the plurality of first parameters of the first vehicle testing tuple is respectively associated with an evaluated operating condition (e.g., a condition in which an autonomous vehicle is designed to operate under, etc.). An evaluated operating condition determining unit 710 is one example of a means for determining that each parameter of a plurality of parameters is respectively associated with an evaluated operating condition as described herein.

The means can be configured to append a tuple to a portion of a plurality of portions of a vehicle testing knowledge structure. For example, the means can be configured to append the first tuple at a first time step to a first portion of a plurality of portions of a vehicle testing knowledge structure. Each of the plurality of portions can include vehicle testing tuple(s) (e.g., the first vehicle testing tuple, etc.), and each of the plurality of portions can correspond to a respective plurality of time steps. The first portion to which the first tuple is appended can correspond to the first time step. A tuple appending unit 715 is one example of a means for appending a tuple to a portion of a vehicle testing knowledge structure as described herein.

The means can be configured to determine that at least one parameter of a plurality of testing parameters is associated with an unevaluated operating condition. For example, the means can be configured to determine that a second parameter of the plurality of second parameters of the second vehicle testing tuple is respectively associated with an unevaluated operating condition (e.g., a condition in which an autonomous vehicle is not designed to operate under, etc.). An unevaluated operating condition determining unit 720 is one example of a means for determining that at least one parameter of a plurality of parameters is associated with an unevaluated operating condition as described herein.

The means can be configured to evaluate an unevaluated operating condition associated with a testing parameter. For example, the means can be configured to evaluate the unevaluated operating condition associated with the second testing parameter of the second vehicle testing tuple (e.g., simulating the unevaluated operating condition, obtaining vehicle performance data for operation under the unevaluated operating condition, etc.). An operating condition evaluating unit 725 is one example of a means for evaluating an unevaluated operating condition associated with a testing parameter as described herein.

The means can be configured to generate a portion for a vehicle testing knowledge structure. For example, the means can be configured to generate a second portion for the vehicle testing knowledge structure that corresponds to the second time step. The second portion can include the second vehicle testing tuple (e.g., a portion of the vehicle knowledge structure including all previous vehicle testing tuples and corresponding to the second time step, etc.). A portion generating unit 730 is one example of a means for generating a portion for a vehicle testing knowledge structure as described herein.

Figure 8:
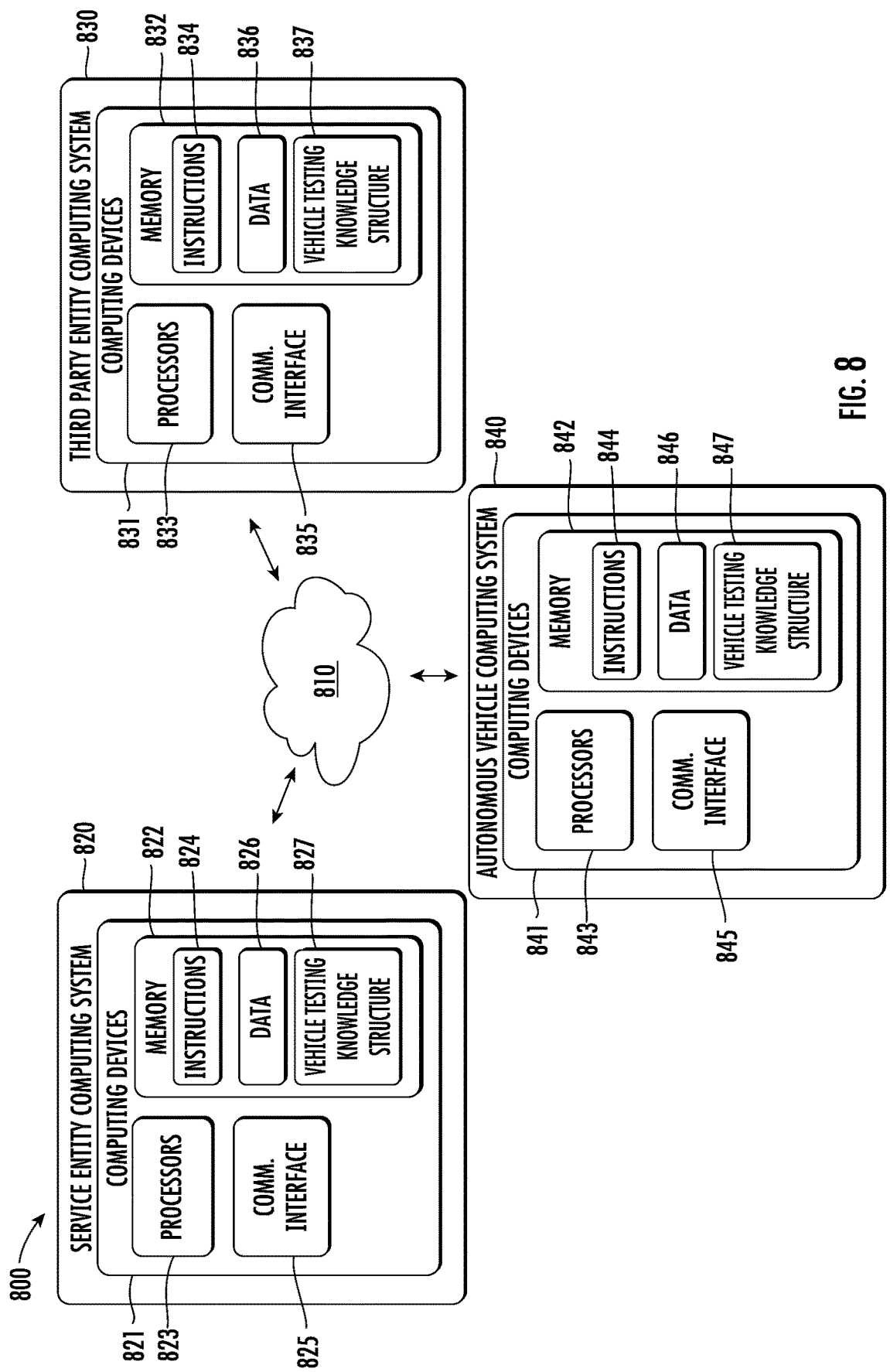
FIG. 8 depicts example system components of an example computing system according to example embodiments of the present disclosure.

FIG. 8 depicts an example system 800 according to example aspects of the present disclosure. The example system 800 illustrated in FIG. 8 is provided as an example only. The components, systems, connections, and/or other aspects illustrated in FIG. 8 are optional and are provided as examples of what is possible, but not required, to implement the present disclosure. The example system 800 can include a service entity computing system 820 (e.g., that is associated with a service entity). The service entity computing system 820 can represent/correspond to the service entity computing system(s) 190A described herein. The example system 800 can include a third-party entity computing system 830 (e.g., that is associated with a third-party entity). The third-party entity computing system 830 can represent/correspond to the third-party entity computing systems 190B and 250 described herein. The example system 800 can include an autonomous vehicle computing system 840 (e.g., that is onboard an autonomous vehicle). The autonomous vehicle computing system 840 can represent/correspond to the vehicle computing system 110 described herein. The service entity computing system 820, the third-party entity computing system 830, and the autonomous vehicle computing system 840 can be communicatively coupled to one another over one or more communication network(s) 810. The networks 810 can correspond to any of the networks described herein, such as communication network(s) 120.

The computing device(s) 821 of the service entity computing system 820 can include processor(s) 823 and a memory 822. The one or more processors 823 can be any suitable processing device (e.g., a processor core, a microprocessor, an ASIC, a FPGA, a controller, a microcontroller, etc.) and can be one processor or a plurality of processors that are operatively connected. The memory 822 can include one or more non-transitory computer-readable storage media, such as RAM, ROM, EEPROM, EPROM, one or more memory devices, flash memory devices, data registrar, etc., and combinations thereof.

The memory 822 can store information that can be accessed by the one or more processors 823. For example, the memory 822 (e.g., one or more non-transitory computer-readable storage mediums, memory devices) can include computer-readable instructions 824 that can be executed by the one or more processors 823. The instructions 824 can be software written in any suitable programming language or can be implemented in hardware. Additionally, or alternatively, the instructions 824 can be executed in logically and/or virtually separate threads on processor(s) 823.

For example, the memory 822 can store instructions 824 that when executed by the one or more processors 823 cause the one or more processors 823 (the service entity computing system 820) to perform operations such as any of the operations and functions of the service entity computing system (or for which it is configured), one or more of the operations and functions for communicating between a third-party entity and/or a service entity and/or an autonomous vehicle, one or more portions of methods 500, 600A, and 600B, and/or one or more of the other operations and functions of the computing systems described herein.

The memory 822 can store data 826 that can be obtained (e.g., acquired, received, retrieved, accessed, created, stored, etc.). The data 826 can include, for example, data associated with communications (e.g., messages, calls, callbacks, etc.), data associated with software package(s) (e.g., Cloud SDK data), data associated with one or more backends, data associated with an API platform, batched data, data associated with vehicle simulation, data associated with vehicle testing scenario(s), data associated with vehicle testing knowledge structure(s), vehicle parameter data, portion data, vehicle testing tuple data, data associated with operating condition(s), data associated with time-step(s), data associated with autonomous vehicles, data associated with third-party entities, sensor data, map data, vehicle state data, vehicle location data, perception data, prediction data, motion planning data, data associated with a vehicle client, data associated with a communication network, data associated with an API, data associated with a library, data associated with user interfaces, data associated with user input, and/or other data/information such as, for example, that described herein. In some implementations, the computing device(s) 821 can obtain data from one or more memories that are remote from the service entity computing system 820.

As an example, the memory 822 of the service entity computing system 820 may include (e.g., store, interact with, access, etc.) vehicle testing knowledge structure 827. The vehicle testing knowledge structure 827 (e.g., a data structure, database, model, etc.) can be or otherwise include a plurality of portions, and each portion of the structure 827 can include one or more vehicle testing tuples for vehicle scenario simulation. Additionally, each portion of the vehicle testing knowledge structure 827 can correspond to a respective time step. More particularly, the vehicle testing knowledge structure 827 can include or otherwise represent the development of evaluated vehicle testing tuples over a plurality of time steps (e.g., by the service entity associated with the service entity computing system 820, etc.). As such, the vehicle testing knowledge structure 827 can represent and/or include the advancement over time of autonomous vehicle systems testing parameters by the service entity, and can also facilitate the usage of such representation for additional testing and validation of autonomous vehicle system performance.

In some implementations, the vehicle testing knowledge structure 827 may be interacted with (e.g., accessed, modified, utilized, etc.) by other computing systems. As an example, the autonomous vehicle computing system 840 may obtain a vehicle testing tuple from the vehicle testing knowledge structure 827 (e.g., via network(s) 810, etc.) of the service entity computing system 820 (e.g., to simulate performance of the autonomous vehicle computing system 840, etc.). As another example, a computing system (e.g., the autonomous vehicle computing system 840, the third-party entity computing system 830, etc.) may access the vehicle testing knowledge structure 827 to instantiate another instance of the vehicle testing knowledge structure locally (e.g., vehicle testing knowledge structure 837, vehicle testing knowledge structure 847, etc.). As yet another example, third-party entity computing system 840 may obtain a current portion (e.g., most up-to-date portion, etc.) from the vehicle testing knowledge structure 827 of the service entity computing system 820 (e.g., to simulate performance of the autonomous vehicle computing system 840, etc.) and append the portion to a local instance of the vehicle testing knowledge structure 837. As such, it should be broadly understood that other computing systems (e.g., 830, 840, etc.) may interact with the vehicle testing knowledge structure 827 or otherwise instantiate and/or copy the vehicle testing knowledge structure 827 for localized use (e.g., structure 837, structure 847, etc.).

The computing device(s) 821 can also include a communication interface 825 used to communicate with one or more other system(s) on-board an autonomous vehicle and/or remote from the service entity computing system, such as third-party entity computing system 830 and an autonomous vehicle computing system 840. The communication interface 825 can include any circuits, components, software, etc. for communicating via one or more networks (e.g., network(s) 810). The communication interface 825 can include, for example, one or more of a communications controller, receiver, transceiver, transmitter, port, conductors, software and/or hardware for communicating data.

The third-party entity computing system 830 can include one or more computing device(s) 831 that are remote from the service entity computing system 820 and/or the autonomous vehicle computing system 840. The computing device(s) 831 can include one or more processors 833 and a memory 832. The one or more processors 833 can be any suitable processing device (e.g., a processor core, a microprocessor, an ASIC, a FPGA, a controller, a microcontroller, etc.) and can be one processor or a plurality of processors that are operatively connected. The memory 832 can include one or more tangible, non-transitory computer-readable storage media, such as RAM, ROM, EEPROM, EPROM, one or more memory devices, flash memory devices, data registrar, etc., and combinations thereof.

The memory 832 can store information that can be accessed by the one or more processors 833. For example, the memory 832 (e.g., one or more tangible, non-transitory computer-readable storage media, one or more memory devices, etc.) can include computer-readable instructions 834 that can be executed by the one or more processors 833. The instructions 834 can be software written in any suitable programming language or can be implemented in hardware. Additionally, or alternatively, the instructions 834 can be executed in logically and/or virtually separate threads on processor(s) 833.

For example, the memory 832 can store instructions 834 that when executed by the one or more processors 833 cause the one or more processors 833 to perform operations such as any of the operations and functions of the third-party entity computing system (or for which it is configured), one or more of the operations and functions for communicating between a third-party entity and/or a service entity and/or an autonomous vehicle, one or more portions of methods 500, 600A, and 600B, and/or one or more of the other operations and functions of the computing systems described herein.

The memory 832 can store data 836 that can be obtained. The data 836 can include, for example, data associated with communications (e.g., messages, calls, callbacks, etc.), data associated with software package(s) (e.g., Cloud SDK data), data associated with one or more backends, data associated with an API platform, batched data, data associated with VIDs, data associated with vehicle simulation, data associated with vehicle testing scenario(s), data associated with vehicle testing knowledge structure(s), vehicle parameter data, portion data, vehicle testing tuple data, data associated with operating condition(s), data associated with time-step(s), data associated with autonomous vehicles, data of an associated vehicle fleet, sensor data, map data, vehicle state data, vehicle location data, perception data, prediction data, motion planning data, data associated with a vehicle client, data associated with a communication network, data associated with an API, data associated with a library, data associated with user interfaces, data associated with user input, and/or other data/information such as, for example, that described herein.

The computing device(s) 831 can also include a communication interface 835 used to communicate with one or more system(s) onboard an autonomous vehicle and/or another computing device that is remote from the system 830, such as autonomous vehicle computing system 840 and service entity computing system 820. The communication interface 835 can include any circuits, components, software, etc. for communicating via one or more networks (e.g., network(s) 810). The communication interface 835 can include, for example, one or more of a communications controller, receiver, transceiver, transmitter, port, conductors, software and/or hardware for communicating data.

The autonomous vehicle computing system 840 can include one or more computing device(s) 841 that are remote from the service entity computing system 820 and the third-party entity computing system 830. The computing device(s) 841 can include one or more processors 843 and a memory 842. The one or more processors 843 can be any suitable processing device (e.g., a processor core, a microprocessor, an ASIC, a FPGA, a controller, a microcontroller, etc.) and can be one processor or a plurality of processors that are operatively connected. The memory 842 can include one or more tangible, non-transitory computer-readable storage media, such as RAM, ROM, EEPROM, EPROM, one or more memory devices, flash memory devices, data registrar, etc., and combinations thereof.

The memory 842 can store information that can be accessed by the one or more processors 843. For example, the memory 842 (e.g., one or more tangible, non-transitory computer-readable storage media, one or more memory devices, etc.) can include computer-readable instructions 844 that can be executed by the one or more processors 843. The instructions 844 can be software written in any suitable programming language or can be implemented in hardware. Additionally, or alternatively, the instructions 844 can be executed in logically and/or virtually separate threads on processor(s) 843.

For example, the memory 842 can store instructions 844 that when executed by the one or more processors 843 cause the one or more processors 843 to perform operations such as any of the operations and functions of the autonomous vehicle computing system (or for which it is configured), one or more of the operations and functions for communicating between a third-party entity and/or a service entity and/or an autonomous vehicle, one or more portions of methods 500, 600A, and 600B, and/or one or more of the other operations and functions of the computing systems described herein.

The memory 842 can store data 846 that can be obtained. The data 846 can include, for example, data associated with communications (e.g., messages, calls, callbacks, etc.), data associated with software package(s) (e.g., Cloud SDK data), data associated with one or more backends, batched data, data associated with vehicle simulation, data associated with vehicle testing scenario(s), data associated with vehicle testing knowledge structure(s), vehicle parameter data, portion data, vehicle testing tuple data, data associated with operating condition(s), data associated with time-step(s), data associated with autonomous vehicles, data associated with third-party entities, sensor data, map data, vehicle state data, vehicle location data, perception data, prediction data, motion planning data, data associated with a vehicle client, data associated with a telecommunication network, data associated with one or more API(s), data associated with a library, data associated with user interfaces, data associated with user input, and/or other data/information such as, for example, that described herein.

The computing device(s) 841 can also include a communication interface 845 used to communicate with one or more system(s) onboard a vehicle and/or another computing device that is remote from the system 840, such as third-party entity computing system 830 and/or service entity computing system 820. The communication interface 845 can include any circuits, components, software, etc. for communicating via one or more networks (e.g., network(s) 810). The communication interface 845 can include, for example, one or more of a communications controller, receiver, transceiver, transmitter, port, conductors, software and/or hardware for communicating data.

The network(s) 810 can be any type of network or combination of networks that allows for communication between devices. In some implementations, the network(s) 810 can include one or more of a local area network, wide area network, the Internet, secure network, cellular network, mesh network, peer-to-peer communication link and/or some combination thereof and can include any number of wired or wireless links. Communication over the network(s) 810 can be accomplished, for example, via a communication interface using any type of protocol, protection scheme, encoding, format, packaging, etc.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method, comprising:
    obtaining, by a computing system comprising one or more computing devices, a first vehicle testing tuple comprising a plurality of first testing parameters and a second vehicle testing tuple comprising a plurality of second testing parameters;
    determining, by the computing system, that each of the plurality of first testing parameters are associated with an evaluated operating condition;
    appending, by the computing system at a first time step, the first vehicle testing tuple to a first portion of a plurality of portions of a vehicle testing knowledge structure, wherein each of the plurality of portions comprises one or more vehicle testing tuples, wherein the plurality of portions corresponds to a respective plurality of time steps, wherein the first portion corresponds to the first time step;
    determining, by the computing system, that a second testing parameter of the plurality of second testing parameters is associated with an unevaluated operating condition;
    evaluating, by the computing system at a second time step after the first time step, the unevaluated operating condition associated with the second testing parameter; and
    generating, by the computing system, a second portion of the vehicle testing knowledge structure comprising the second vehicle testing tuple for the vehicle testing knowledge structure, wherein the second portion of the vehicle testing knowledge structure corresponds to the second time step, wherein the second portion of the vehicle testing knowledge structure is subsequent to the first portion of the vehicle testing knowledge structure, and wherein the second portion of the vehicle testing knowledge structure comprises each vehicle testing tuple of the first portion of the vehicle testing knowledge structure.

2. The computer-implemented method of claim 1, wherein the method further comprises:
    obtaining, by the computing system, performance data descriptive of autonomous vehicle performance for a first scenario type;
    determining, by the computing system, a subset of portions from the plurality of portions of the vehicle testing knowledge structure, wherein each of the subset of portions comprises one or more vehicle testing tuples associated with the first scenario type; and
    performing, by the computing system, simulations using each of the subset of portions to obtain simulation data descriptive of simulated autonomous vehicle performance for the first scenario type.

3. The computer-implemented method of claim 2, wherein the method further comprises:
    evaluating, by the computing system, a difference between the performance data descriptive of the autonomous vehicle performance and the simulation data to determine a simulation accuracy value indicative of a simulation accuracy for the first scenario type by the vehicle testing knowledge structure; and
    verifying, by the computing system based at least in part on the simulation accuracy value, the vehicle testing knowledge structure for generation of simulation data equivalent to the data descriptive of the autonomous vehicle performance for the first scenario type.

4. The computer-implemented method of claim 3, wherein the method further comprises:
    reducing, by the computing system, a number of required autonomous vehicle testing miles by a number of miles associated with the simulation data descriptive of the autonomous vehicle performance for the first scenario type.

5. The computer-implemented method of claim 1, wherein the method further comprises:
    obtaining, by the computing system, data descriptive of an unknown scenario type;
    determining, by the computing system, that a known scenario type represented by one or more vehicle testing tuples of the vehicle testing knowledge structure is similar to the unknown scenario type; and simulating, by the computing system, a scenario of the unknown scenario type using the one or more vehicle testing tuples of the vehicle testing knowledge structure associated with the known scenario type to obtain simulation data descriptive of autonomous vehicle performance for the unknown scenario type.

6. The computer-implemented method of claim 5, wherein determining that the known scenario type represented by the one or more vehicle testing tuples of the vehicle testing knowledge structure is similar to the unknown scenario type comprises:

obtaining, by the computing system, vehicle operating data associated with the unknown scenario type; and evaluating, by the computing system, a difference between the vehicle operating data and previous performance data associated with simulation of the known scenario type using the one or more vehicle testing tuples.

7. The computer-implemented method of claim 5, wherein the unknown scenario type comprises a plurality of autonomous vehicle maneuvers, and wherein the known scenario type comprises a subset of the plurality of autonomous vehicle maneuvers.

8. The computer-implemented method of claim 1, wherein the plurality of first testing parameters describe at least one of:

one or more environmental conditions;
one or more required vehicle maneuvers;
one or more surface conditions;
a location for each of one or more actors;
a pose for each of the one or more actors; or
one or more respective behaviors for each of the one or more actors.

9. The computer-implemented method of claim 1, wherein:

the unevaluated operation condition comprises an operating condition that has not been evaluated for operation of autonomous vehicles; and evaluating, by the computing system at the second time step after the first time step, the unevaluated operating condition associated with the second testing parameter comprises:

obtaining, by the computing system, data descriptive of a performance of an autonomous vehicle for the unevaluated operating condition; and storing, by the computing system based at least in part on the data, the unevaluated operating condition as an evaluated operating condition within the vehicle testing knowledge structure.

10. The computer-implemented method of claim 9, wherein the data descriptive of a performance of an autonomous vehicle that is operating under the unevaluated operating condition is based at least in part on:

a simulation of the autonomous vehicle for the unevaluated operating condition;

sensor data from the autonomous vehicle for the unevaluated operating condition; or sensor data from the autonomous vehicle for an evaluated operating condition equivalent to the unevaluated operating condition.

11. A computing system, comprising:

one or more processors;

a vehicle testing knowledge structure comprising a plurality of portions, wherein each of the plurality of portions comprises one or more vehicle testing tuples each comprising a plurality of vehicle testing parameters, wherein the plurality of portions corresponds to a respective plurality of time steps; and one or more tangible, non-transitory computer readable media storing computer-readable instructions that when executed by the one or more processors cause the one or more processors to perform operations, the operations comprising:

obtaining a first vehicle testing tuple comprising a plurality of first testing parameters and a second vehicle testing tuple comprising a plurality of second testing parameters;

determining that each of the plurality of first testing parameters are associated with an evaluated operating condition;

appending the first vehicle testing tuple to a first portion of the plurality of portions of the vehicle testing knowledge structure at a first time step of the plurality of time steps, wherein the first portion corresponds to the first time step;

determining that a second testing parameter of the plurality of second testing parameters is associated with an unevaluated operating condition;

evaluating the unevaluated operating condition associated with the second testing parameter at a second time step after the first time step; and generating a second portion of the vehicle testing knowledge structure comprising the second vehicle testing tuple for the vehicle testing knowledge structure, wherein the second portion of the vehicle testing knowledge structure corresponds to the second time step, wherein the second portion of the vehicle testing knowledge structure is subsequent to the first portion of the vehicle testing knowledge structure, and wherein the second portion of the vehicle testing knowledge structure comprises each vehicle testing tuple of the first portion of the vehicle testing knowledge structure.

12. The computing system of claim 11, wherein the operations further comprise:

obtaining performance data descriptive of autonomous vehicle performance for a first scenario type;

determining a subset of portions from the plurality of portions of the vehicle testing knowledge structure, wherein each of the subset of portions comprises one or more vehicle testing tuples associated with the first scenario type; and performing simulations using each of the subset of portions to obtain simulation data descriptive of simulated autonomous vehicle performance for the first scenario type.

13. The computing system of claim 12, wherein the operations further comprise:

evaluating a difference between the performance data descriptive of the autonomous vehicle performance and the simulation data to determine a simulation accuracy value indicative of a simulation accuracy for the first scenario type by the vehicle testing knowledge structure; and verifying, based at least in part on the simulation accuracy value, the vehicle testing knowledge structure for generation of simulation data equivalent to the data descriptive of the autonomous vehicle performance for the first scenario type.

14. The computing system of claim 13, wherein the operations further comprise:
  reducing a number of required autonomous vehicle testing miles by a number of miles associated with the simulation data descriptive of the autonomous vehicle performance for the first scenario type.

15. The computing system of claim 13, wherein the operations further comprise:
  obtaining data descriptive of an unknown scenario type;
  determining that a known scenario type represented by one or more vehicle testing tuples of the vehicle testing knowledge structure is similar to the unknown scenario type; and
  simulating a scenario of the unknown scenario type using the one or more vehicle testing tuples of the vehicle testing knowledge structure associated with the known scenario type to obtain simulation data descriptive of autonomous vehicle performance for the unknown scenario type.

16. The computing system of claim 15, wherein determining that the known scenario type represented by the one or more vehicle testing tuples of the vehicle testing knowledge structure is similar to the unknown scenario type comprises:
  obtaining vehicle operating data associated with the unknown scenario type; and
  evaluating a difference between the vehicle operating data and previous performance data associated with simulation of the known scenario type using the one or more vehicle testing tuples.

17. The computing system of claim 11, wherein:
  the unevaluated operation condition comprises an operating condition that has not been evaluated for operation of autonomous vehicles; and
  evaluating, at the second time step after the first time step, the unevaluated operating condition associated with the second testing parameter comprises:
    obtaining data descriptive of a performance of an autonomous vehicle for the unevaluated operating condition; and
    storing, based at least in part on the data, the unevaluated operating condition as an evaluated operating condition within the vehicle testing knowledge structure.

18. One or more tangible, non-transitory computer readable media storing computer-readable instructions that when executed by one or more processors cause the one or more processors to perform operations, the operations comprising:
  obtaining a first vehicle testing parameter grouping comprising a plurality of first testing parameters and a second vehicle testing parameter grouping comprising a plurality of second testing parameters;
  determining that each of the plurality of first testing parameters are associated with an evaluated operating condition;
  appending, at a first time step, the first vehicle testing parameter grouping to a first portion of a plurality of portions of a vehicle testing knowledge structure, wherein each of the plurality of portions comprises one or more vehicle testing parameter groupings, wherein the plurality of portions corresponds to a respective plurality of time steps, wherein the first portion corresponds to the first time step;
  determining that a second testing parameter of the plurality of second testing parameters is associated with an unevaluated operating condition;
  evaluating, at a second time step after the first time step, the unevaluated operating condition associated with the second testing parameter; and
  generating a second portion of the vehicle testing knowledge structure comprising the second vehicle testing parameter grouping for the vehicle testing knowledge structure, wherein the second portion of the vehicle testing knowledge structure corresponds to the second time step, wherein the second portion is subsequent to the first portion of the vehicle testing knowledge structure, and wherein the second portion of the vehicle testing knowledge structure comprises each vehicle testing parameter grouping of the first portion of the vehicle testing knowledge structure.

19. The one or more tangible, non-transitory media of claim 18, wherein the operations further comprise:
  obtaining performance data descriptive of autonomous vehicle performance for a first scenario type;
  determining a subset of portions from the plurality of portions of the vehicle testing knowledge structure, wherein each of the subset of portions comprises one or more vehicle testing parameter groupings associated with the first scenario type;
  performing simulations using each of the subset of portions to obtain simulation data descriptive of simulated autonomous vehicle performance for the first scenario type;
  evaluating a difference between the performance data descriptive of the autonomous vehicle performance and the simulation data to determine a simulation accuracy value indicative of a simulation accuracy for the first scenario type by the vehicle testing knowledge structure; and
  verifying, based at least in part on the simulation accuracy value, the vehicle testing knowledge structure for generation of simulation data equivalent to the data descriptive of the autonomous vehicle performance for the first scenario type.

* * * * *

UNITED STATES PATENT AND TRADEMARK OFFICE
CERTIFICATE OF CORRECTION

| | | |
|---|---|---|
| PATENT NO. | : 11,981,338 B2 | Page 1 of 1 |
| APPLICATION NO. | : 17/140597 | |
| DATED | : May 14, 2024 | |
| INVENTOR(S) | : Venkatadri et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 421 days.

Signed and Sealed this
Thirtieth Day of September, 2025

John A. Squires
*Director of the United States Patent and Trademark Office*